United States Patent
Iyer et al.

(10) Patent No.: US 12,411,297 B2
(45) Date of Patent: Sep. 9, 2025

(54) MICROFLUIDICS SYSTEM, INSTRUMENT, AND CARTRIDGE INCLUDING SELF-ALIGNING OPTICAL FIBER SYSTEM AND METHOD

(71) Applicants: Nicoya Lifesciences Inc., Kitchener (CA); Advanced Instrument PTE. LTD., Singapore (SG)

(72) Inventors: Krishna Iyer, Waterloo (CA); Eikky Lim Eng Kuan, Singapore (SG); Gordon H. Hall, Cambridge (CA)

( * ) Notice: Subject to any disclaimer, the term of this patent is extended or adjusted under 35 U.S.C. 154(b) by 0 days.

(21) Appl. No.: 18/519,610

(22) Filed: Nov. 27, 2023

(65) Prior Publication Data
US 2024/0094488 A1   Mar. 21, 2024

Related U.S. Application Data

(63) Continuation of application No. PCT/CA2022/050854, filed on May 26, 2022.
(Continued)

(51) Int. Cl.
*G02B 6/42* (2006.01)
*B01L 3/00* (2006.01)
*G01N 21/552* (2014.01)

(52) U.S. Cl.
CPC ...... *G02B 6/4292* (2013.01); *B01L 3/502715* (2013.01); *G01N 21/554* (2013.01);
(Continued)

(58) Field of Classification Search
CPC ........ G02B 6/4292; G02B 6/406; G02B 6/43; B01L 3/502715; B01L 2200/025;
(Continued)

(56) References Cited

U.S. PATENT DOCUMENTS 5,452,390 A * 9/1995 Bechtel .................. G02B 6/421
385/60
6,485,189 B1   11/2002 Gilliland et al.
(Continued)

FOREIGN PATENT DOCUMENTS

CA          2814720 A1    4/2012
KR       20210017067 A    2/2021
(Continued)

OTHER PUBLICATIONS

International Search Report issued in International Patent Application No. PCT/CA2022/050854, mailed Aug. 30, 2022, 9 pages.
(Continued)

*Primary Examiner* — Jennifer Wecker
*Assistant Examiner* — Britney N. Washington
(74) *Attorney, Agent, or Firm* — Quarles & Brady LLP

(57) ABSTRACT

The present invention is directed to microfluidics systems, instruments, and cartridges including self-aligning optical fiber systems and methods of use thereof. More specifically, the disclosure describes a microfluidics instrument including an optical detection system, microfluidics cartridge, and a self-aligning optical fiber system capable of coupling the microfluidics instrument and the microfluidics cartridge. Further, the disclosure provides methods of optical detection operations using a microfluidics system.

19 Claims, 27 Drawing Sheets

Related U.S. Application Data

(60) Provisional application No. 63/237,868, filed on Aug. 27, 2021, provisional application No. 63/193,944, filed on May 27, 2021.

(52) U.S. Cl.
CPC ..... *B01L 2200/025* (2013.01); *B01L 2200/04* (2013.01); *B01L 2300/0654* (2013.01); *B01L 2300/0864* (2013.01); *G01N 2201/0833* (2013.01)

(58) Field of Classification Search
CPC ......... B01L 2200/04; B01L 2300/0654; B01L 2300/0864; G01N 21/554; G01N 2201/0833; G01N 2201/08; G01N 21/553
See application file for complete search history.

(56) References Cited

U.S. PATENT DOCUMENTS

| | | | |
|---|---|---|---|
| 7,553,453 | B2 | 6/2009 | Gu et al. |
| 8,940,147 | B1 | 1/2015 | Bartsch et al. |
| 2007/0190525 | A1* | 8/2007 | Gu .................... G01N 15/1484 435/5 |
| 2007/0211985 | A1* | 9/2007 | Duer .................... G01N 21/253 422/82.11 |
| 2009/0068668 | A1 | 3/2009 | Duer |
| 2009/0147253 | A1 | 6/2009 | Hartmann et al. |
| 2022/0341843 | A1* | 10/2022 | Anderson .............. G01N 21/05 |

FOREIGN PATENT DOCUMENTS

| | | | | |
|---|---|---|---|---|
| WO | WO-2006088976 | A2 * | 8/2006 | ............. B82Y 15/00 |
| WO | WO-2006098700 | A1 * | 9/2006 | ........ B01L 3/502784 |
| WO | 2020049524 | A1 | 3/2020 | |
| WO | 2020132146 | A1 | 6/2020 | |
| WO | 2021146804 | A1 | 7/2021 | |
| WO | 2021146809 | A1 | 7/2021 | |

OTHER PUBLICATIONS

Written Opinion of the International Searching Authority issued in International Patent Application No. PCT/CA2022/050854, mailed Aug. 30, 2022, 7 pages.

Hartman et al., A low-cost, manufacturable method for fabricating capillary and optical fiber interconnects for microfluidic devices, Lab on a Chip, Royal Society of Chemistry, Apr. 8, 2008, 8(4):609-616.

European Patent Office, Extended European Search Report, Application No. 22810019.4, Feb. 20, 2025, 10 pages.

\* cited by examiner (FRONT)

(BACK)

(BOTTOM)

MICROFLUIDICS SYSTEM, INSTRUMENT, AND CARTRIDGE INCLUDING SELF-ALIGNING OPTICAL FIBER SYSTEM AND METHOD

FIELD OF THE INVENTION

The presently disclosed subject matter relates generally to optical fiber interfaces and more particularly to a microfluidics system, instrument, and cartridge including a self-aligning optical fiber system and method.

RELATED APPLICATIONS

The presently-disclosed subject matter is related to and claims priority to International Application No. PCT/CA2022/050854 entitled "Microfluidics system, instrument, and cartridge including self-aligning optical fiber system and method," filed on May 26, 2022; U.S. Provisional Patent Application No. U.S. 63/193,944, entitled "Microfluidics Instrument and Cartridge Including an Optical Fiber Alignment Mechanism," filed on May 27, 2021; and U.S. Provisional Patent Application No. U.S. 63/237,868, entitled "Microfluidics System, Instrument, and Cartridge Including Self-Aligning Optical Fiber System and Method," filed on Aug. 27, 2021; the entire disclosures of which are herein incorporated by reference.

BACKGROUND

In applications that require optical coupling between two systems, devices, and/or components, it may be difficult to accomplish optical coupling in an easy and automated manner. For example, typical optical fiber couplers are single connectors that are manipulated manually or have screw terminals to make the connection.

In microfluidics applications, for example, optical coupling may be required between a microfluidics instrument and a microfluidics device (or cartridge). In this example, a limitation is that optical fibers may be manually connected to the microfluidics device (or cartridge) one at a time. Further, the number of optical connections may be limited. Another limitation is that the mechanical complexity of optical coupling may lie mostly at the microfluidics device (or cartridge) side of the system and with little or no complexity at the microfluidics instrument side of the system. Therefore, new approaches are needed with respect to optical coupling between two systems, devices, and/or components.

SUMMARY

In some aspects, the present invention is directed to a microfluidics system comprising: (a) a microfluidics instrument, wherein the microfluidics instrument includes an optical detection system; (b) a microfluidics cartridge; and (c) a self-aligning optical fiber system; wherein the self-aligning optical fiber system optically couples the microfluidics instrument and the microfluidics cartridge. In some embodiments, the optical detection system comprises an illumination source and an optical measurement device.

In some embodiments, the microfluidics system includes a self-aligning optical fiber system comprises an instrument fiber optic coupler and a cartridge fiber optic connector. In some embodiments, the self-aligning optical fiber system comprises a plurality of optical detection channels, wherein each of the plurality of optical detection channels comprises an instrument optical channel and a cartridge optical channel. In one embodiment, the self-aligning optical fiber system comprises from about 4 to about 16 optical detection channels. In one embodiment, each of the instrument optical channels optically connects each of the cartridge optical channels to the optical measurement device.

In some embodiments, the instrument fiber optic coupler comprises a plurality of instrument ferrule assemblies each comprising a leading tip end and an instrument optical fiber. In some embodiments, the cartridge fiber optic connector further comprises a plurality of cartridge ferrule assemblies each comprising a receiving end capable of receiving the instrument ferrule assembly and each comprising a cartridge optical fiber.

In some embodiments, the microfluidics instrument further comprises a movable slide mechanism, and wherein the movable slide mechanism is operable to create an optical coupling between the microfluidics instrument and the microfluidics cartridge by engaging the instrument fiber optic coupler with the cartridge fiber optic connector. In other embodiments, the movable slide mechanism is operable to engage the instrument ferrule assembly to the cartridge ferrule assembly and thereby coupling the instrument optical fibers to the cartridge optical fibers. In still other embodiments, the movable slide mechanism comprises a slidable base plate mounted on a rail, a backplate mounted on the end of slidable base plate, a leadscrew and associated motor operable to advance and/or retract the instrument fiber optic coupler with respect to the cartridge fiber optic connector.

In one embodiment, the microfluidic cartridge further comprises: (a) a bottom substrate, wherein the bottom substrate comprises a droplet operations surface; (b) a top substrate; and wherein the bottom substrate and the top substrate are separated by a droplet operation gap therebetween. In some embodiments, the microfluidics cartridge is a digital microfluidics cartridge (DMF). In some embodiment, the bottom substrate and/or top substrate comprise a PCB substrate, a glass substrate or a silicon substrate, and wherein the PCB substrate, glass substrate, or silicon substrate is optionally coated with a dielectric layer and one or more electrodes operable for droplet operations.

In some embodiments, the droplet operation gap between the bottom substrate and the top substrate is filled with a filler fluid. In one embodiment, the filler fluid is a low-viscosity oil or a halogenated oil.

In some embodiments, the optical detection system comprises one or more surface plasmon resonance (SPR) sensors or one or more localized surface plasmon resonance (LSPR) sensors.

In accordance with another aspect, the present invention is directed to a method for performing an optical detection operation, the method comprising: (a) providing a microfluidics system, wherein the microfluidics system comprises a microfluidics instrument, a microfluidics cartridge and a plurality of optical detection channels, wherein: (i) the microfluidics instrument comprises an instrument fiber optics coupler; and (ii) the microfluidics cartridge comprises a cartridge fiber optics connector; (b) performing a first optical alignment step to align the instrument fiber optic coupler to the cartridge fiber optic connector; (c) performing a second optical alignment step to individually align each optical detection channel; and (d) performing an optical detection operation using the microfluidics system, microfluidics instrument and microfluidics cartridge.

In one embodiment, the microfluidic instrument further comprises a movable slide mechanism, and wherein the first optical alignment step is carried out by moving the movable slide mechanism until the fiber optics coupler engages the fiber optics connector. In one embodiment, the fiber optics coupler is moved towards a stationary fiber optics connector. In some embodiments, the first optical alignment step results in a course alignment of each of the plurality of optical detection channels.

In one embodiment, the second optical alignment step results in a fine alignment of each of the plurality of optical detection channels. In some embodiments, the second alignment step is carried out by continuing to translate the movable slide mechanism towards the microfluidics cartridge until the fiber optics coupler fully engages the fiber optics connector, and thereby individually aligning each of the optical detection channels.

In some embodiments, the fiber optics coupler further comprises a plurality of instrument ferrule assemblies each comprising a leading tip end and an instrument optical fiber, wherein the fiber optics connector further comprises a plurality of cartridge ferrule assemblies each comprising a receiving end capable of receiving the instrument ferrule assembly and each comprising a cartridge optical fiber, and wherein the movable slide is moved until each of the instrument ferrule assemblies engages each of the cartridge ferrule assemblies, thereby connecting the instrument optical fibers with the cartridge optical fibers and creating the plurality of optical detection channels. In other embodiments, the instrument fiber optic coupler further comprises a housing having one or more dowel pins, wherein the cartridge optic connector further comprises a housing having one or more datum holes and wherein the one or more datum holes accept the one or more dowel pins during the first alignment step. In one embodiment, the dowel pins align instrument fiber optic coupler to cartridge fiber optic connector.

In one embodiment, the second alignment step results in Z-direction alignment between the fiber optics coupler and fiber optics connector. In another embodiment, the second alignment step results in Z-direction alignment between each of the instrument ferrule assemblies and each of the cartridge ferrule assemblies and aligns the instrument optical fibers and the cartridge optical fibers face-to-face substantially without leaving any gap therebetween. In still another embodiment, the instrument ferrule assembly further comprises a spring and wherein the spring aligns the instrument optical fibers and the cartridge optical fibers face-to-face substantially without leaving any gap therebetween.

In one embodiment, the instrument optical fibers are aligned to within about +/−0.7 mm of cartridge optical fibers. In another embodiment, the instrument optical fibers are aligned to within about +/−50 µm of cartridge optical fibers. In some embodiments, an optic gel is applied between the instrument optical fibers and the cartridge optical fibers.

In some embodiments, the microfluidics system further comprises an optical detection system comprising an illumination source and an optical measurement device. In other embodiments, the optical detection system comprises surface plasmon resonance (SPR) or localized surface plasmon resonance (LSPR), and wherein the optical detection system comprises an SPR or LSPR illumination source and one or more SPR or LSPR optical measurement devices. In still other embodiments, wherein the microfluidics cartridge is a digital microfluidics cartridge (DMF).

BRIEF DESCRIPTION OF THE DRAWINGS

The features and advantages of the present invention will be more clearly understood from the following description taken in conjunction with the accompanying drawings, which are not necessarily drawn to scale, and wherein.

DEFINITIONS

Figure 1:
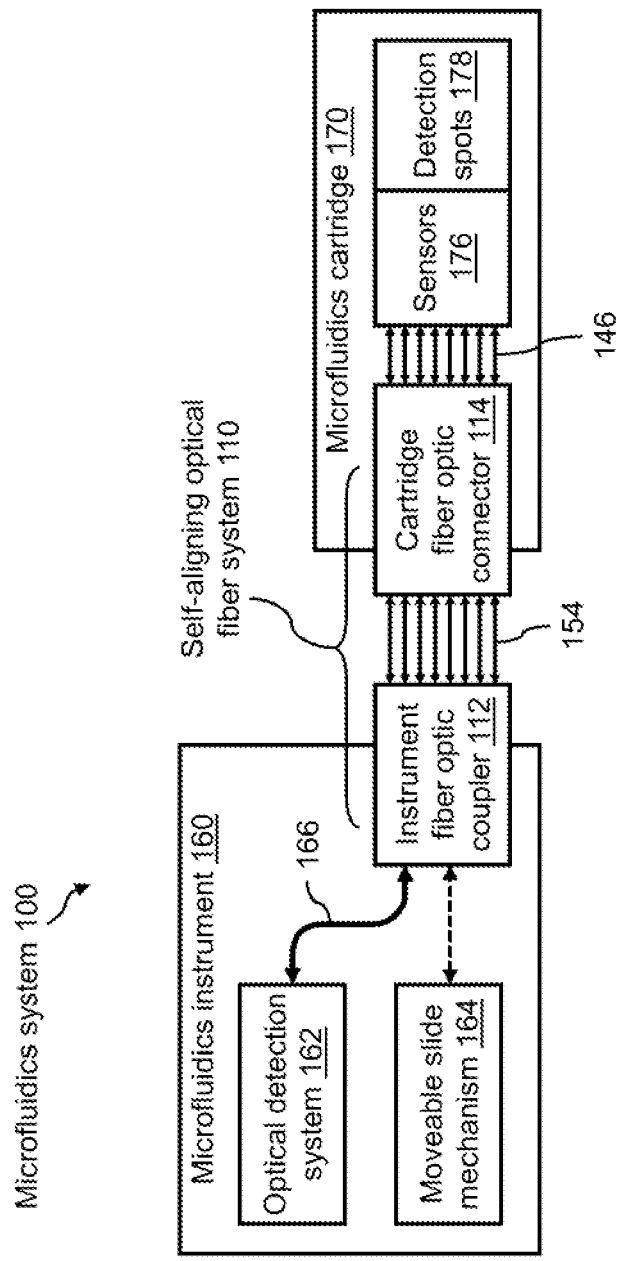
FIG. 1 illustrates a block diagram of a microfluidics system including an example of the presently disclosed self-aligning optical fiber system for coupling optically a microfluidics instrument and a microfluidics device (or cartridge)

"Activate," with reference to one or more electrodes, means affecting a change in the electrical state of the one or more electrodes which, in the presence of a droplet, results in a droplet operation. Activation of an electrode can be accomplished using alternating current (AC) or direct current (DC). Any suitable voltage may be used. For example, an electrode may be activated using a voltage which is greater than about 5 V, or greater than about 20 V, or greater than about 40 V, or greater than about 100 V, or greater than about 200 V or greater than about 300 V. The suitable voltage being a function of the dielectric's properties such as thickness and dielectric constant, liquid properties such as viscosity and many other factors as well. Where an AC signal is used, any suitable frequency may be employed. For example, an electrode may be activated using an AC signal having a frequency from about 1 Hz to about 10 MHz, or from about 1 Hz and 10 KHz, or from about 10 Hz to about 240 Hz, or about 60 Hz.

"Droplet" means a volume of liquid on a droplet actuator. Typically, a droplet is at least partially bounded by a filler fluid. For example, a droplet may be completely surrounded by a filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components.

"Droplet Actuator" means a device for manipulating droplets. Microfluidics devices, microfluidics cartridges, digital microfluidics (DMF) devices, and DMF cartridges are examples of droplet actuators. Certain droplet actuators will include one or more substrates arranged with a droplet operations gap therebetween and electrodes associated with (e.g., patterned on, layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Droplet actuators will include various electrode arrangements on the top and/or bottom substrates. During droplet operations it is preferred that droplets remain in continuous contact or frequent contact with a ground or reference electrode. A ground or reference electrode may be associated with the top substrate facing the gap, the bottom substrate facing the gap, or within the gap itself. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. Where multiple substrates are used, a spacer may be provided between the substrates to determine the height of the gap therebetween and define on-actuator dispensing reservoirs. The spacer height may, for example, be from about 5 µm to about 1000 µm, or about 100 µm to about 400 µm, or about 200 µm to about 350 µm, or about 250 µm to about 300 µm, or about 275 µm. The spacer may, for example, be formed of features or layers projecting from the top or bottom substrates, and/or a material inserted between the top and bottom substrates. One or more openings may be provided in the one or more substrates for forming a fluid path through which liquid may be delivered into the droplet operations gap.

In some cases, the top and/or bottom substrate of a droplet actuator includes a PCB substrate that is coated with a dielectric, such as a polyimide dielectric, which may in some cases also be coated or otherwise treated to make the droplet operations surface hydrophobic. Various materials are also suitable for use as the dielectric component of the droplet actuator. In some cases, the top and/or bottom substrate of a droplet actuator includes a glass or silicon substrate on which features have been patterned using process technology borrowed from semiconductor device fabrication including the deposition and etching of thin layers of materials using microlithography. The top and/or bottom substrate may consist of a semiconductor backplane (i.e., a thin-film transistor (TFT) active-matrix controller) on which droplet operations electrodes have been formed.

Electrodes of a droplet actuator are typically controlled by a controller or a processor, which is itself provided as part of a system, which may include processing functions as well as data and software storage and input and output capabilities. Reagents may be provided on the droplet actuator in the droplet operations gap or in a reservoir fluidly coupled to the droplet operations gap. The reagents may be in liquid form, e.g., droplets, or they may be provided in a reconstitutable form in the droplet operations gap or in a reservoir fluidly coupled to the droplet operations gap. Reconstitutable reagents may typically be combined with liquids for reconstitution.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles. For examples of droplet operations, see the patents and patent applications cited above under the definition of "droplet actuator." Impedance and/or capacitance sensing and/or imaging techniques may sometimes be used to determine or confirm the outcome of a droplet operation. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. Droplet transport time can be quite fast. For example, in various embodiments, transport of a droplet from one electrode to the next may be completed within about 1 sec, or about 0.1 sec, or about 0.01 sec, or about 0.001 sec. In one embodiment, the electrode is operated in AC mode but is switched to DC mode for imaging. It is helpful for conducting droplet operations for the footprint area of droplet to be similar to or larger than the electrowetting area; in other words, 1×-, 2×-3×-droplets are usefully controlled and/or operated using 1, 2, and 3 electrodes, respectively. If the droplet footprint is greater than number of electrodes available for conducting a droplet operation at a given time, the difference between the droplet size and the number of electrodes should typically not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

"Filler fluid" means a fluid associated with a droplet operations substrate of a droplet actuator, which fluid is sufficiently immiscible with a droplet phase to render the droplet phase subject to electrode-mediated droplet operations. For example, the droplet operations gap of a droplet actuator is typically filled with a filler fluid. The filler fluid may, for example, be or include a low-viscosity oil, such as silicone oil or hexadecane. The filler fluid may be or include a halogenated oil, such as a fluorinated or perfluorinated oil. The filler fluid may fill the entire gap of the droplet actuator or may only coat one or more surfaces of the droplet actuator. Filler fluids may be selected to improve droplet operations and/or reduce loss of reagent or target substances from droplets, reduce formation of unwanted microdroplets, reduce cross contamination between droplets, reduce contamination of droplet actuator surfaces, reduce degradation of droplet actuator materials, reduce evaporation of droplets, etc. For example, filler fluids may be selected for compatibility with droplet actuator materials. As an example, fluorinated filler fluids may be usefully employed with fluorinated surface coatings. Fluorinated filler fluids are useful to reduce loss of lipophilic compounds, such as umbelliferone substrates like 6-hexadecanoylamido-4-methylumbelliferone substrates (e.g., for use in Krabbe, Niemann-Pick, or other assays); Filler fluids may, for example, be doped with surfactants or other additives. For example, additives may be selected to improve droplet operations and/or reduce loss of reagent or target substances from droplets, formation of microdroplets, cross contamination between droplets, contamination of droplet actuator surfaces, degradation of droplet actuator materials, etc. Composition of the filler fluid, including surfactant doping, may be selected for performance with reagents or samples used in the specific assay protocols and effective interaction or non-interaction with droplet actuator materials. For example, fluorinated oils may in some cases be doped with fluorinated surfactants, e.g., Zonyl FSO-100 (Sigma-Aldrich) and/or others.

The terms "top," "bottom," "over," "under," and "on" are used throughout the description with reference to the relative positions of components of the droplet actuator, such as relative positions of top and bottom substrates of the droplet actuator. It will be appreciated that in many cases the droplet actuator is functional regardless of its orientation in space.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface. In one example, filler fluid can be considered as a dynamic film between such liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

DETAILED DESCRIPTION OF THE INVENTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a microfluidics system, instrument, and cartridge including a self-aligning optical fiber system and method.

In some embodiments, the presently disclosed microfluidics system, instrument, and cartridge including a self-aligning optical fiber system and method provide a mechanism that enables the interface between a microfluidics instrument and a disposable microfluidics device (or cartridge) that includes embedded optical fiber sensors.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system that ensure a good optical mate (about <10 um spacing, about <100 um concentricity deviation) therebetween.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system that ensure a good optical mate therebetween and across a significant distance allowing easy to manufacture tolerances on the disposable microfluidics device to enable mass-manufacturing.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system and wherein the self-aligning optical fiber system may support any number of optical detection channels, such as, but not limited to, sixteen (16) optical detection channels. In general, any number of optical detection channels can be used. For example, in some embodiments, the self-aligning optical fiber system may comprise from about four (4) to about sixteen (16), from about four (4) to about fourteen (14), or from about six (6) to about twelve (12) optical detection channels. In other embodiments, the self-aligning optical fiber system may comprise 4, 6, 8, 10, 12, 14, or 16 optical detection channels.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system that engage and align in one or two stages: (1) a course alignment stage that aligns the instrument fiber optic coupler to the cartridge fiber optic connector and/or (2) a fine alignment stage that aligns individually each optical channel of the instrument fiber optic coupler and the cartridge fiber optic connector.

In some embodiments, the presently disclosed microfluidics system, instrument, and cartridge including a self-aligning optical fiber system and method provide an instrument fiber optic coupler on the microfluidics instrument side of the microfluidics system that may include a line or arrangement of multiple (e.g., sixteen) instrument ferrule assemblies and wherein each of the instrument ferrule assemblies may include an off-the-shelf ferrule. In general, any number of instrument ferrule assemblies can be used. For example, in some embodiments, the microfluidics system may comprise a line or arrangement of from about four (4) to about sixteen (16), from about four (4) to about fourteen (14), from about (6) to about twelve (12) instrument ferrule assemblies. In other embodiments, the microfluidics system may comprise 4, 6, 8, 10, 12, 14, or 16 instrument ferrule assemblies. Furthermore, in some embodiments, each of the instrument ferrule assemblies includes an instrument optical fiber.

In some embodiments, the presently disclosed microfluidics system, instrument, and cartridge including a self-aligning optical fiber system and method provide a cartridge fiber optic connector on the microfluidics device (or cartridge) side of the microfluidics system that may include a line or arrangement of multiple (e.g., sixteen) cartridge ferrule assemblies and wherein each of the cartridge ferrule assemblies may include a cup-shaped custom ferrule that is designed to accept the off-the-shelf ferrule of the instrument ferrule assemblies and implements the optical fiber fine alignment. In general, any number of cartridge ferrule assemblies can be used. For example, in some embodiments, the microfluidics system may comprise a line or arrangement of from about four (4) to about sixteen (16), from about four (4) to about fourteen (14), from about (6) to about twelve (12) cartridge ferrule assemblies. In still other embodiments, the microfluidics system may comprise 4, 6, 8, 10, 12, 14, or 16 cartridge ferrule assemblies. Furthermore, in some embodiments, each of the cartridge ferrule assemblies includes a cartridge optical fiber.

In some embodiments, the presently disclosed microfluidics system, instrument, and cartridge including a self-aligning optical fiber system and method provide an instrument fiber optic coupler on the microfluidics instrument side of the microfluidics system and a cartridge fiber optic connector on the microfluidics device (or cartridge) side of the microfluidics system for aligning a series of optical fibers (e.g., sixteen) in the cartridge fiber optic connector simultaneously onto the same number of optical fibers (e.g., sixteen) in the instrument fiber optic coupler to transmit the optic result concurrently through the established optical channels for diagnostics in the microfluidics system and/or instrument.

In some embodiments, the presently disclosed microfluidics system, instrument, and cartridge and method may provide a self-aligning optical fiber system in which the tolerance for aligning a line of multiple optical fibers across some distance lies substantially entirely in each individual mating of one instrument ferrule assembly to one cartridge ferrule assembly, not in the collective arrangement of, for example, sixteen instrument ferrule assemblies mating to sixteen cartridge ferrule assemblies across some distance (although other arrangements are contemplated herein). While the presently disclosed self-aligning optical fiber system may be described herein with reference to a microfluidics system, instrument, and cartridge, the presently disclosed self-aligning optical fiber system may not be limited to microfluidics applications only. This is exemplary only. The presently disclosed self-aligning optical fiber system may be used in any applications requiring optical coupling and/or interfaces between two systems, devices, and/or components.

Additionally, while the presently disclosed self-aligning optical fiber system may be described herein with reference to supporting sixteen (16) optical detection channels in a microfluidics system, instrument, and cartridge, the presently disclosed self-aligning optical fiber system may not be limited to supporting sixteen (16) optical detection channels only. This is exemplary only. The presently disclosed self-aligning optical fiber system may be provided to support any number of optical detection channels, as described elsewhere herein.

Referring now to FIG. 1 is a block diagram of a microfluidics system 100 including an example of the presently disclosed self-aligning optical fiber system for coupling optically a microfluidics instrument and a microfluidics device (or cartridge). In this example, microfluidics system 100 may include a self-aligning optical fiber system 110. Self-aligning optical fiber system 110 further includes an instrument fiber optic coupler 112 on the instrument side of microfluidics system 100 and a cartridge fiber optic connector 114 on the microfluidics cartridge side of microfluidics system 100.

For example, microfluidics system 100 may include a microfluidics instrument 160 and a microfluidics cartridge 170 that may be coupled optically using self-aligning optical fiber system 110. In this example, instrument fiber optic coupler 112 of self-aligning optical fiber system 110 may be provided at microfluidics instrument 160. Further, cartridge fiber optic connector 114 of self-aligning optical fiber system 110 may be provided at microfluidics cartridge 170.

Microfluidics instrument 160 may further include an optical detection system 162 and a movable slide mechanism 164. Instrument fiber optic coupler 112 at microfluidics instrument 160 may include an arrangement of optical fibers 154, such as sixteen optical fibers 154. The sixteen optical fibers 154 may run from instrument fiber optic coupler 112 to optical detection system 162 via a fiber optic bundle 166.

Optical detection system 162 of microfluidics instrument 160 may be, for example, an optical measurement system that includes an illumination source (not shown) and an optical measurement device (not shown). For example, optical detection system 162 may be a fluorimeter that provides both excitation and detection. In this example, the illumination source (e.g., a light source for the visible range (400-800 nm)) and the optical measurement device (e.g., charge coupled device, photodetector, spectrometer, photodiode array) may be arranged with respect to microfluidics cartridge 170. Further, microfluidics system 100 is not limited to one optical detection system 162 only (e.g., one illumination source and one optical measurement device only). Microfluidics system 100 may include multiple optical detection systems 162 (e.g., multiple illumination sources and/or multiple optical measurement devices) to support multiple detection spots 178 of microfluidics cartridge 170.

Figure 2A:
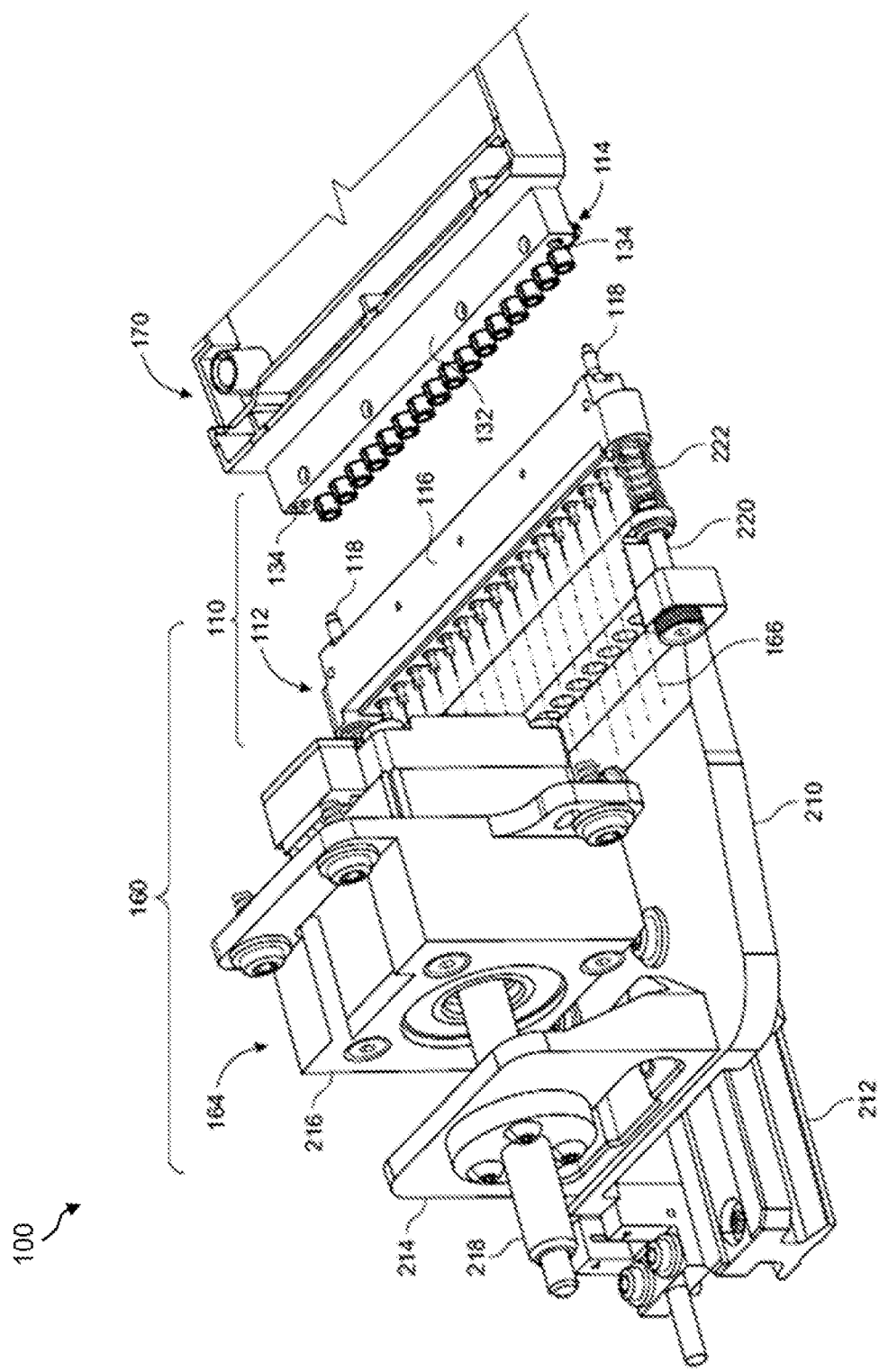
FIG. 2A illustrates a perspective view of an example instantiation of the microfluidics system shown in FIG. 1 and including the microfluidics instrument coupled optically to the microfluidics device (or cartridge) using the presently disclosed self-aligning optical fiber system.

Movable slide mechanism 164 of microfluidics instrument 160 may be any mechanism for sliding microfluidics instrument 160 toward the stationary microfluidics cartridge 170 that are arranged in the same plane. The sliding action of movable slide mechanism 164 is used to engage instrument fiber optic coupler 112 at microfluidics instrument 160 with cartridge fiber optic connector 114 at microfluidics cartridge 170. In this way, optical coupling occurs between microfluidics instrument 160 and microfluidics cartridge 170. That is, optical pathways or channels are provided from detection spots 178 of microfluidics cartridge 170 to optical detection system 162 of microfluidics instrument 160. An example of movable slide mechanism 164 is shown in FIG. 2A.

Microfluidics cartridge 170 may be, for example, any disposable or non-disposable digital microfluidics (DMF) device (or cartridge), droplet actuator device (or cartridge), droplet operations device (or cartridge), and the like. Cartridge fiber optic connector 114 may include an arrangement of optical fibers 146, such as sixteen optical fibers 146. The sixteen optical fibers 146 may run from cartridge fiber optic connector 114 to sixteen respective sensors 176 and/or sixteen respective detection spots 178 of microfluidics cartridge 170.

In one example, sensors 176 may be surface plasmon resonance (SPR) sensors that support the detection spots 178 (i.e.; detection channels) of microfluidics cartridge 170. In this example, each SPR sensor 176 may be a functionalized SPR sensor 176 (i.e., ligands immobilized on the surface).

In another example, sensors 176 may be localized surface plasmon resonance (LSPR) sensors. In this example, each LSPR sensor 176 may be a functionalized for (1) detecting, for example, certain molecules (e.g., target analytes) and/or chemicals in the sample, and (2) analysis of analytes; namely, for measuring binding events in real time to extract ON-rate information, OFF-rate information, and/or affinity information.

In one example, detection spots 178 of microfluidics cartridge 170 may be certain droplet operations electrodes (i.e., electrowetting electrodes, not shown) dedicated to optical detection operations of microfluidics system 100. More details of sensors 176 and detection spots 178 of microfluidics cartridge 170 are shown and described hereinbelow with reference to FIG. 6.

In self-aligning optical fiber system 110, optical fibers 154 of instrument fiber optic coupler 112 align with and couple optically to the respective optical fibers 146 of cartridge fiber optic connector 114. More details of the optical coupling mechanisms of self-aligning optical fiber system 110 are shown and described hereinbelow with reference to FIG. 2A through FIG. 26.

Further, self-aligning optical fiber system 110 may not be limited to supporting sixteen (16) optical detection channels only, such as the sixteen optical fibers 154 of instrument fiber optic coupler 112 coupled optically to the sixteen optical fibers 146 of cartridge fiber optic connector 114. Self-aligning optical fiber system 110 including instrument fiber optic coupler 112 and cartridge fiber optic connector 114 may be designed to support any number of optical detection channels.

Referring now to FIG. 2A is a perspective view of an example instantiation of microfluidics system 100 shown in FIG. 1 and including microfluidics instrument 160 coupled optically to microfluidics cartridge 170 using the presently disclosed self-aligning optical fiber system 110.

In this example, movable slide mechanism 164 may include a slidable base plate 210 mounted on a rail 212, a backplate 214 mounted on the end of slidable base plate 210 furthest from microfluidics cartridge 170. Additionally, movable slide mechanism 164 may include a motor 216 that is held stationary with respect to slidable base plate 210 and backplate 214. A leadscrew 218 of motor 216 may be threaded through a threaded hole of backplate 214. Generally, motor 216 may be used to advance and/or retract instrument fiber optic coupler 112 at microfluidics instrument 160 with respect to cartridge fiber optic connector 114 at microfluidics cartridge 170.

Additionally, instrument fiber optic coupler 112 of self-aligning optical fiber system 110 is arranged at the end of slidable base plate 210 that is opposite backplate 214. Instrument fiber optic coupler 112 may be held to the end of slidable base plate 210 using a screw or fastener 220 and spring 222 at each side of slidable base plate 210 to engage each end of instrument fiber optic coupler 112. In this arrangement, screws or fasteners 220 float on springs 222, screws or fasteners 220 are not used to pull and engage instrument fiber optic coupler 112 to movable slide mechanism 164. Rather, screws or fasteners 220 provide sliding guides while the screw action of motor 216 and leadscrew 218 may be used to translate slidable base plate 210 in the same plane as microfluidics cartridge 170. In doing so, the totality of movable slide mechanism 164, instrument fiber optic coupler 112, and cartridge fiber optic connector 114 of microfluidics instrument 160 are pulled together and engaged.

Figure 2B:
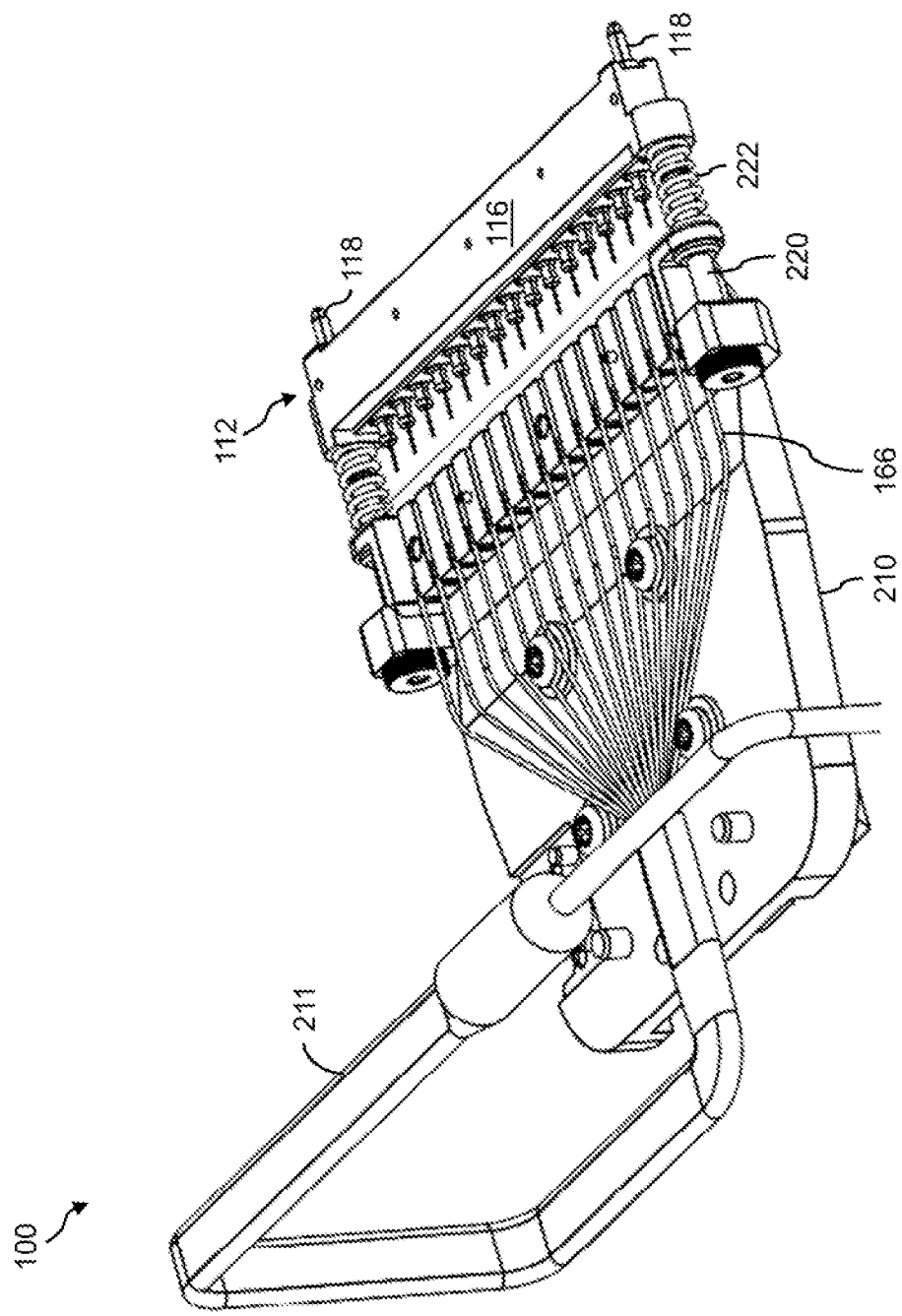
FIG. 2B illustrates a perspective view of an example of the microfluidics instrument potion of the microfluidics system shown in FIG. 1.

FIG. 2A also shows that instrument fiber optic coupler 112 may include a coupler housing 116 that has a dowel pin 118 at each side. In one example, dowel pins 118 may be 1.6 mm diameter dowel pins. Further, cartridge fiber optic connector 114 may include connector housing 132 that has a cartridge datum hole 134. The two cartridge datum holes 134 at connector housing 132 of cartridge fiber optic connector 114 are designed to receive the two dowel pins 118 at coupler housing 116 of instrument fiber optic coupler 112. Further to the example, FIG. 2B shows a perspective view of an example of the microfluidics instrument potion of microfluidics system 100 shown in FIG. 1. For example, FIG. 2B shows more details of a cable 211 for providing fiber optic bundle 166 to instrument fiber optic coupler 112.

More details of align instrument fiber optic coupler 112 and cartridge fiber optic connector 114 are shown and described hereinbelow with reference to FIG. 3 through FIG. 25.

In microfluidics system 100, instrument fiber optic coupler 112 of microfluidics instrument 160 and cartridge fiber optic connector 114 of microfluidics instrument 160 may engage and align in two stages: (1) a course alignment stage that aligns instrument fiber optic coupler 112 to cartridge fiber optic connector 114 and (2) a fine alignment stage that aligns individually each optical channel of instrument fiber optic coupler 112 and cartridge fiber optic connector 114. The process of using movable slide mechanism 164 may be used to perform the first of the two stages, which is the course alignment stage that uses dowel pins 118 to align instrument fiber optic coupler 112 to cartridge fiber optic connector 114. In this course alignment stage, optical fibers 154 (not visible) of instrument fiber optic coupler 112 may be aligned (end-to-end or face-to-face) to within about +/−0.7 mm of optical fibers 146 (not visible) of cartridge fiber optic connector 114.

Figure 3:
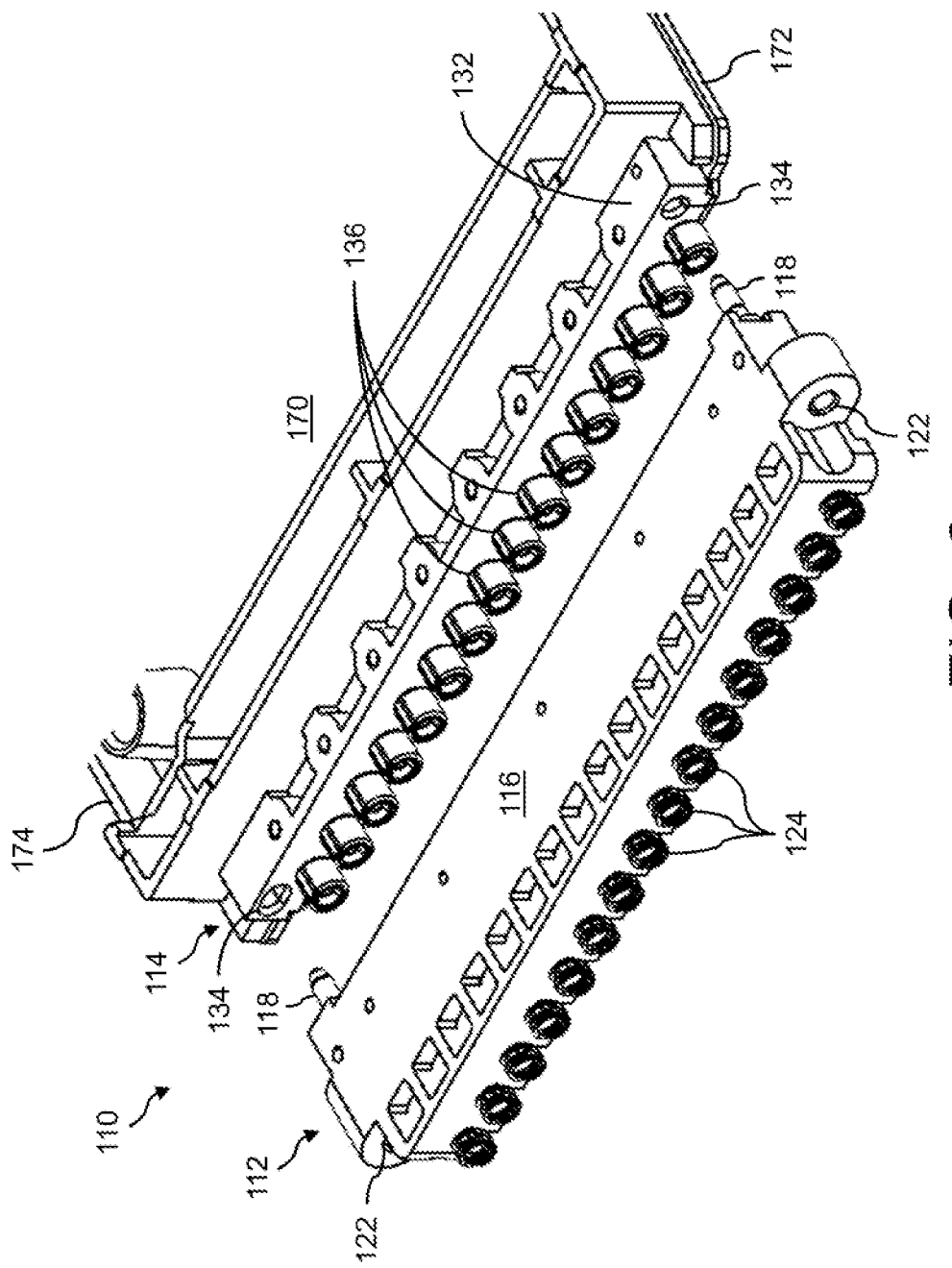
FIG. 3, FIG. 4, and FIG. 5 illustrate perspective views of an example of the presently disclosed self-aligning optical fiber system shown in FIG. 1 and FIG. 2 and including an instrument fiber optic coupler and a cartridge fiber optic connector.
Figure 4:
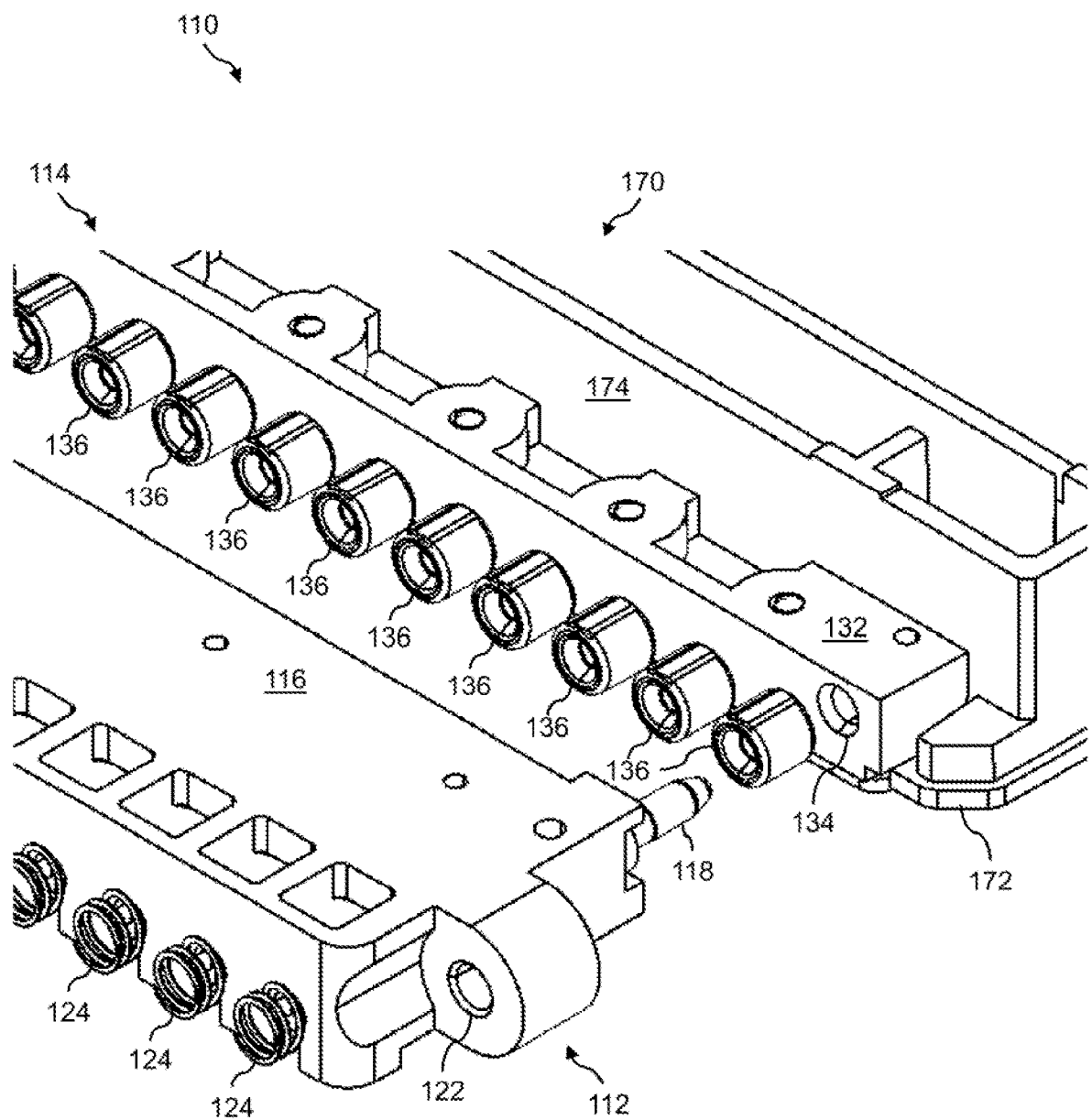
Figure 5:
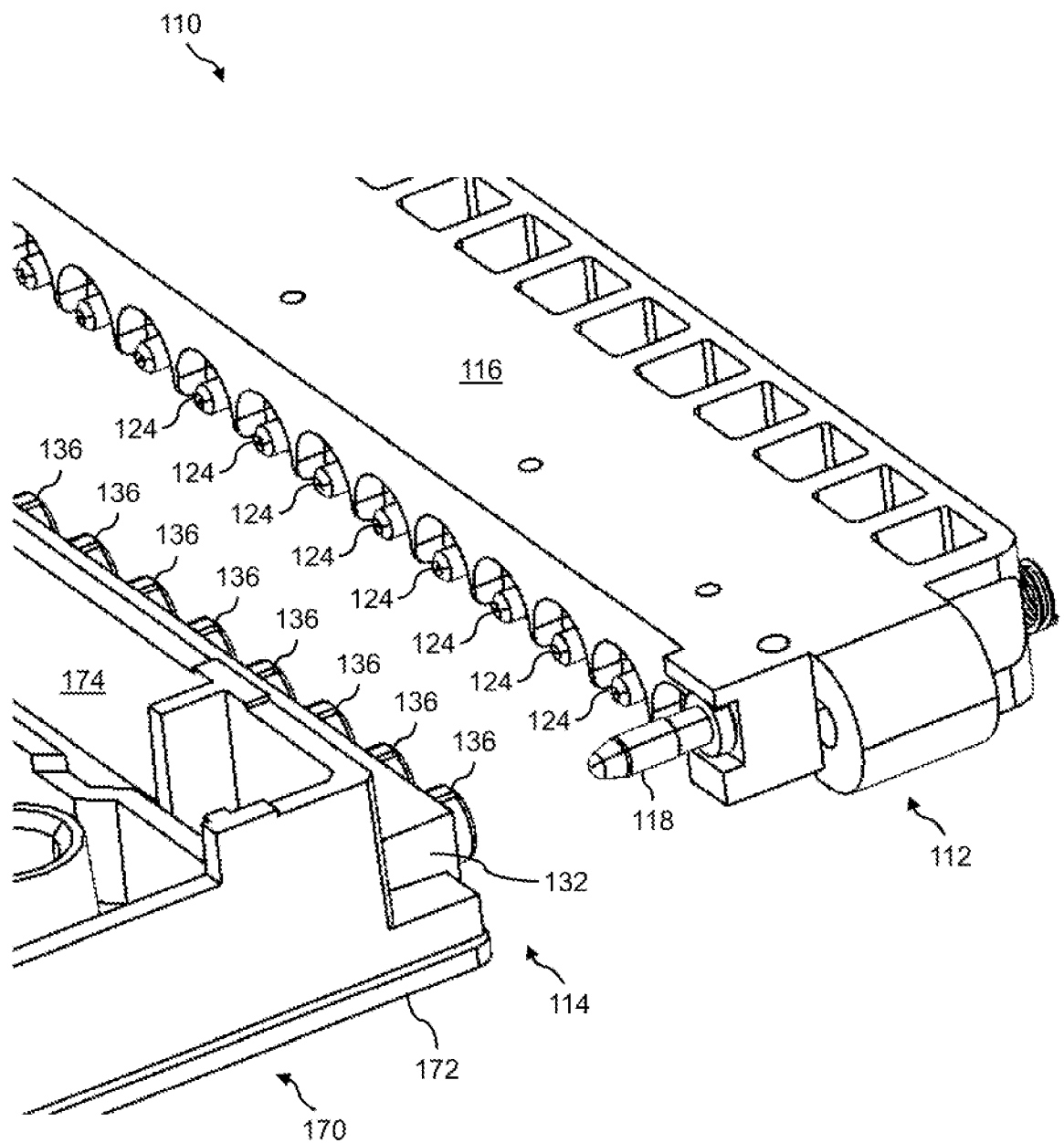

Referring now to FIG. 3, FIG. 4, and FIG. 5 is perspective views of an example of the presently disclosed self-aligning optical fiber system 110 shown in FIG. 1 and FIG. 2A and including instrument fiber optic coupler 112 and cartridge fiber optic connector 114. Further, FIG. 3, FIG. 4, and FIG. 5 show instrument fiber optic coupler 112 in relation to cartridge fiber optic connector 114, but not yet mechanically and/or optically coupled. Additionally, FIG. 3, FIG. 4, and FIG. 5 show more clearly the two dowel pins 118 at coupler housing 116 of instrument fiber optic coupler 112 in relation to the two cartridge datum holes 134 at connector housing 132 of cartridge fiber optic connector 114. Additionally, FIG. 3 and FIG. 4 show fastener holes 122 at the ends of coupler housing 116 (e.g., one on each end of coupler housing 116) for receiving screws or fasteners 220 of slidable base plate 210.

In this example, coupler housing 116 of instrument fiber optic coupler 112 may hold an arrangement of instrument ferrule assemblies 124 that include optical fibers 154 (not visible). In this example, coupler housing 116 holds sixteen instrument ferrule assemblies 124 for holding optical fibers 154, arranged in a line. Similarly, connector housing 132 of cartridge fiber optic connector 114 may hold an arrangement of cartridge ferrule assemblies 136 that include optical fibers 146 (not visible). In this example, connector housing 132 holds sixteen cartridge ferrule assemblies 136 for holding optical fibers 146, arranged in a line.

Additionally, microfluidics cartridge 170 may include a bottom substrate 172 and a top substrate 174 separated by a droplet operations gap (not shown). In one example, bottom substrate 172 may b a printed circuit board (PCB) and top substrate 174 may be a substantially transparent glass or plastic substrate. Further, connector housing 132 of cartridge fiber optic connector 114 may be integrated into top substrate 174 of microfluidics cartridge 170. For example, connector housing 132 and top substrate 174 may be a one-piece molded plastic design. Further, bottom substrate 172 may include any arrangements of droplet operations electrodes (i.e., electrowetting electrodes, not shown) for conducting droplet operations on a droplet operations surface.

Figure 6:
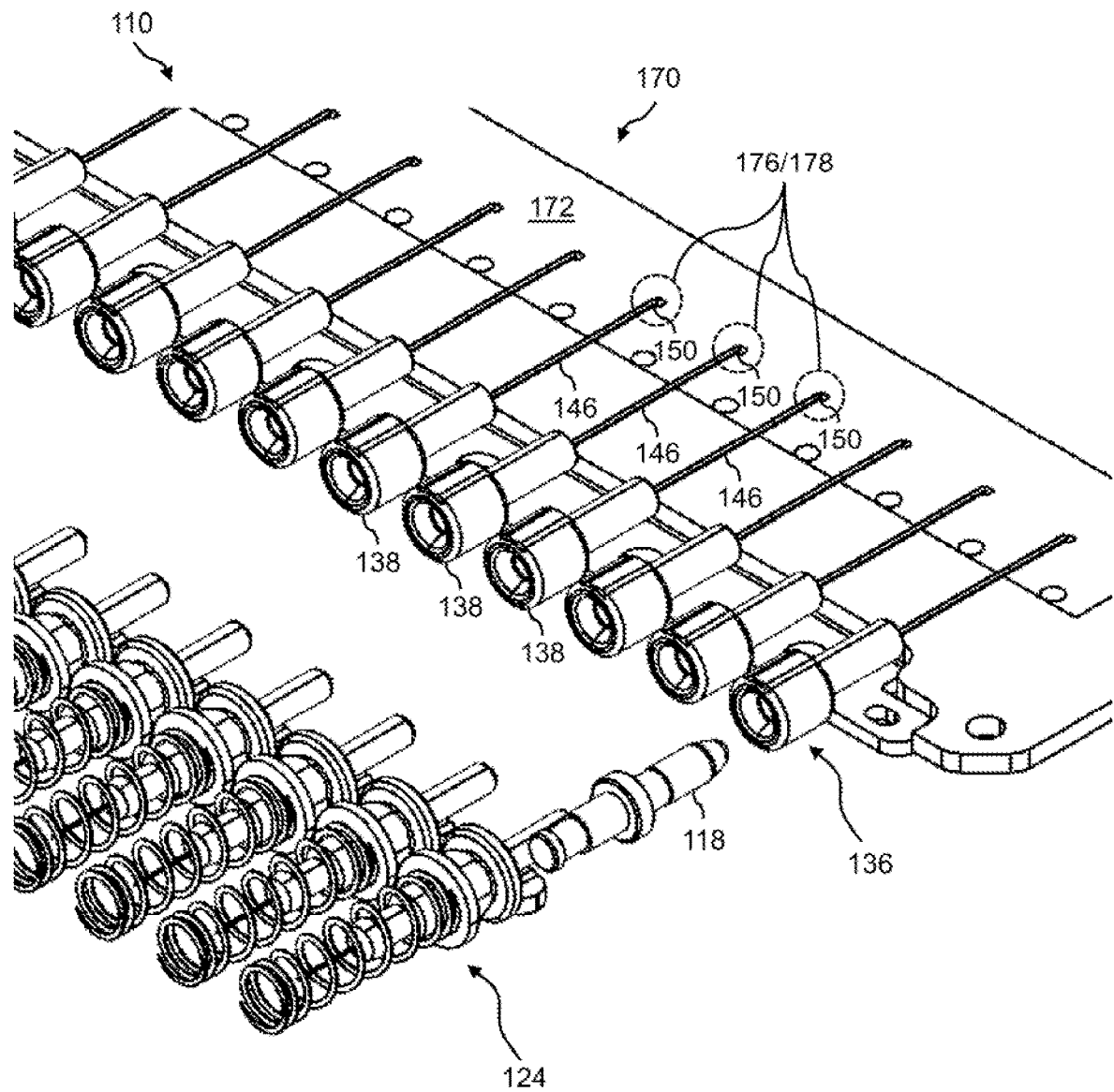
FIG. 6 illustrates a perspective view showing more details of the presently disclosed self-aligning optical fiber system shown in FIG. 1 through FIG. 5.

Referring now to FIG. 6 is a perspective view showing more details of the presently disclosed self-aligning optical fiber system 110 shown in FIG. 1 through FIG. 5. For example, FIG. 6 shows only the arrangement of instrument ferrule assemblies 124 of instrument fiber optic coupler 112. More details of instrument fiber optic coupler 112 and instrument ferrule assembly 124 are shown and described hereinbelow with reference to FIG. 7A through FIG. 14.

Further, FIG. 6 shows microfluidics cartridge 170 absent top substrate 174 and showing more details of cartridge ferrule assemblies 136. For example, each cartridge ferrule assembly 136 may include a cartridge ferrule 138 holding an optical fiber 146. A distal end 150 of optical fiber 146 may include a sensor 176 (e.g., SPR sensor 176 and/or LSPR sensor 176). Further, distal end 150 of optical fiber 146 with sensor 176 may be positioned at a certain detection spot 178, which is a certain detection channel of microfluidics cartridge 170. In another example, the distal end 150 of optical fiber 146 may be absent sensor 176 and, instead, sensor 176 may be provided at detection spot 178 as a part of microfluidics cartridge 170 and/or droplet operations. More details of cartridge ferrule assembly 136 are shown and described hereinbelow with reference to FIG. 15A through FIG. 19.

Figure 7A:
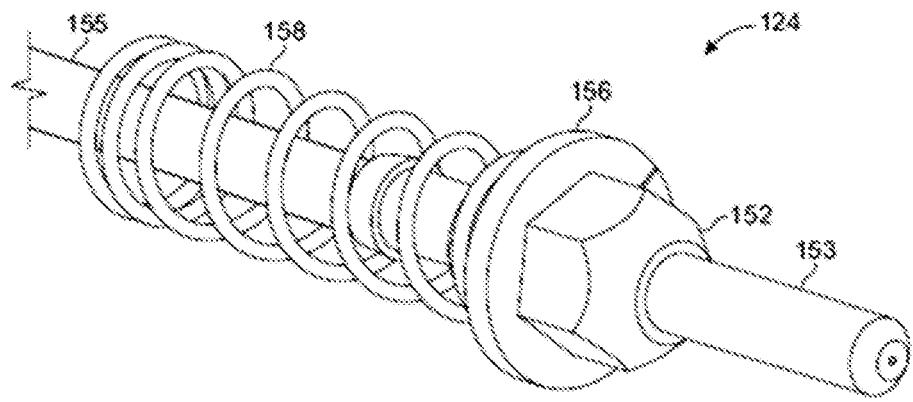
FIG. 7A and FIG. 7B illustrate a perspective view and an exploded view, respectively, of an example of an instrument ferrule assembly of the instrument fiber optic coupler shown in FIG. 13 and FIG. 14.
Figure 7B:
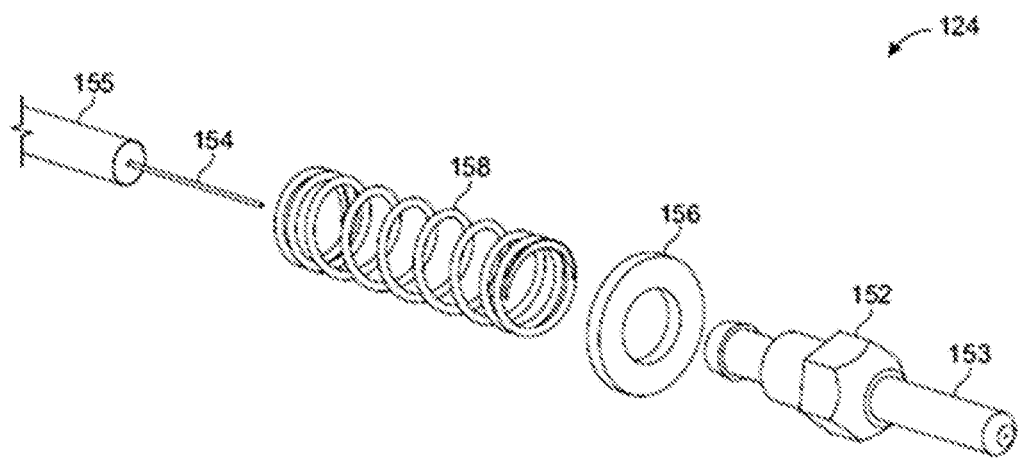
Figure 13:
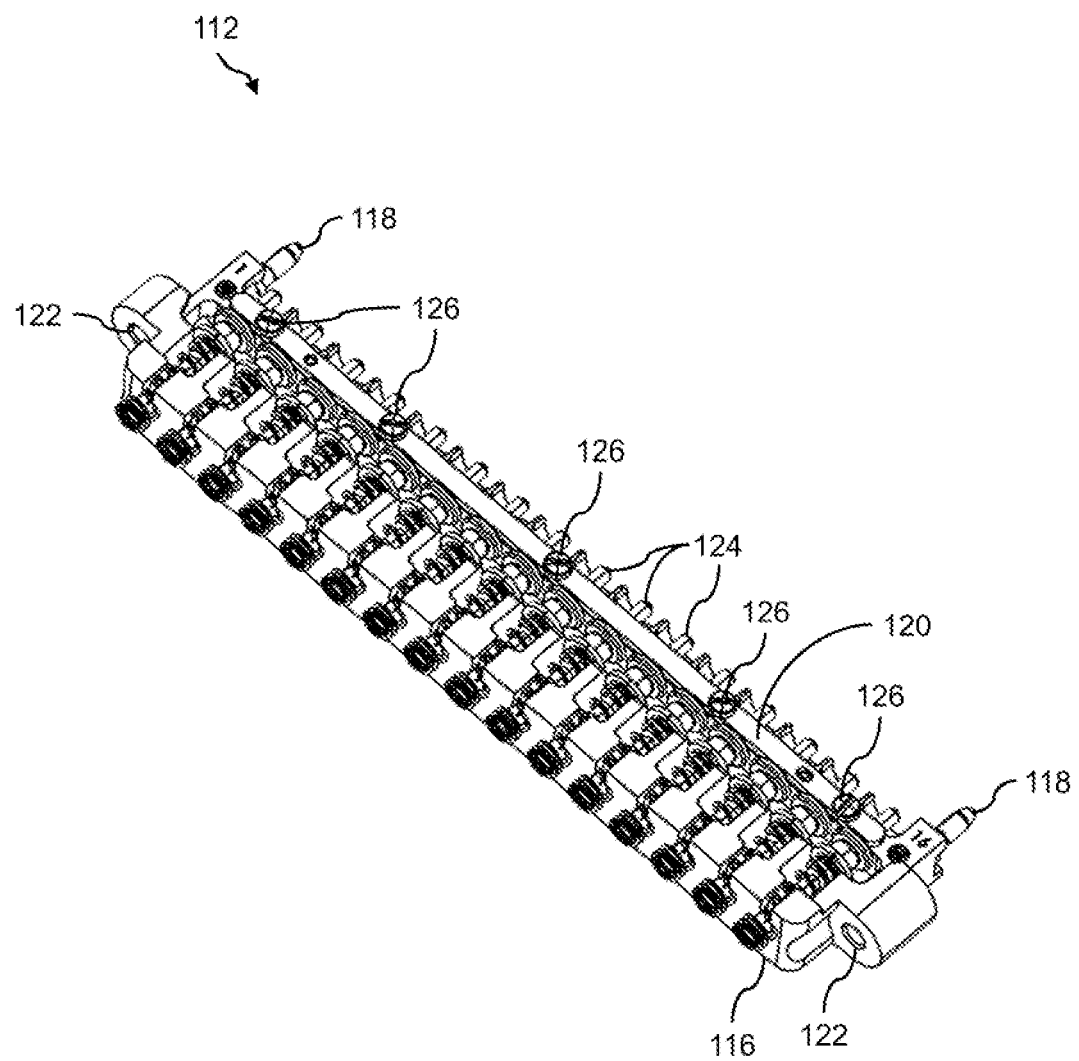
FIG. 13 and FIG. 14 illustrate a perspective view and an exploded view, respectively, of an example of the instrument fiber optic coupler of the presently disclosed self-aligning optical fiber system shown in FIG. 1 through FIG. 6.
Figure 14:
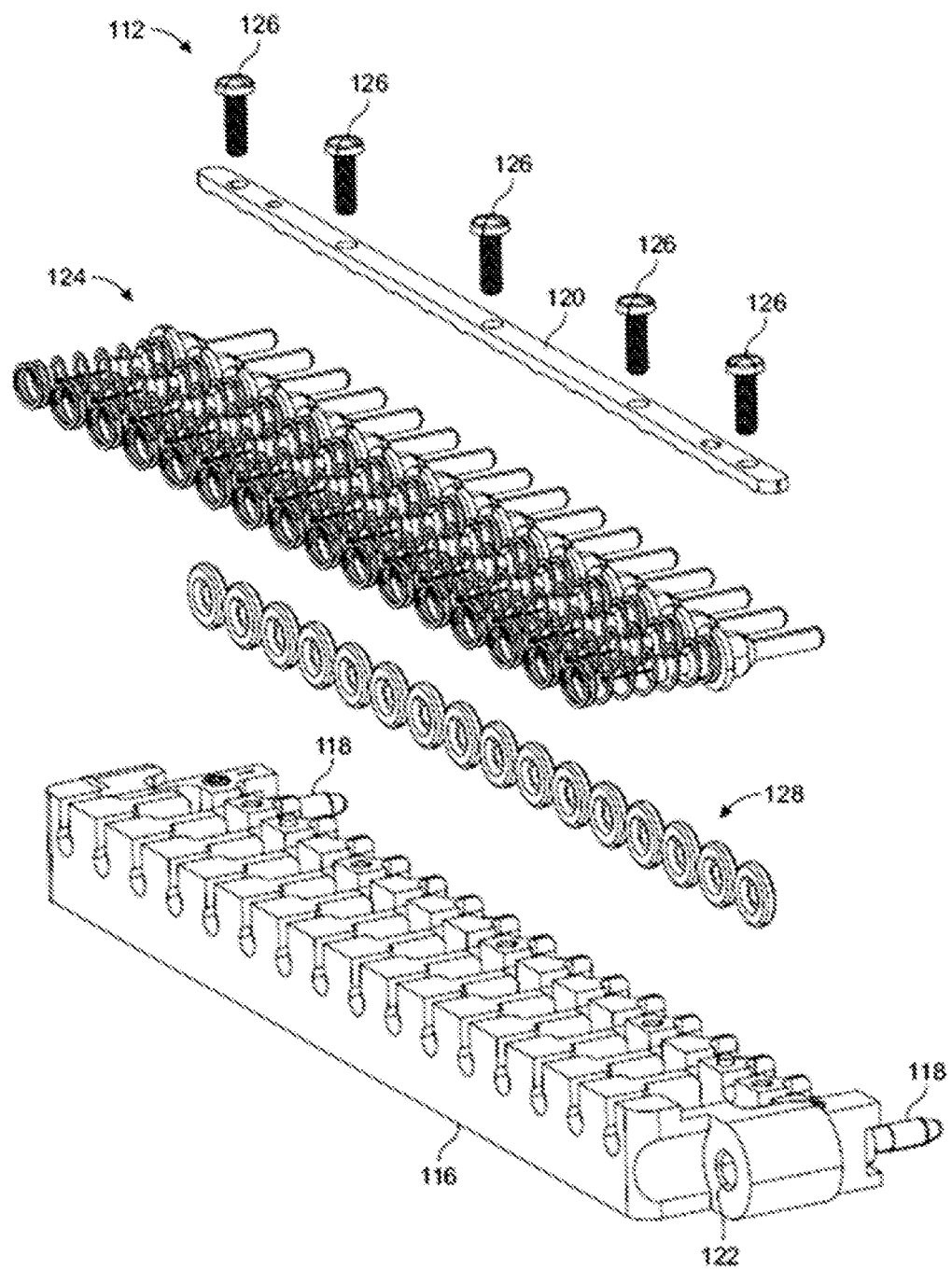

Referring now to FIG. 7A and FIG. 7B is a perspective view and an exploded view, respectively, of an example of instrument ferrule assembly 124 of instrument fiber optic coupler 112 shown in FIG. 13 and FIG. 14. In this example, each instrument ferrule assembly 124 of instrument fiber optic coupler 112 may include an instrument ferrule 152 that has a leading tip 153, an optical fiber 154 encased in cable cladding 155, a flat washer 156, and a spring 158.

Figure 8:
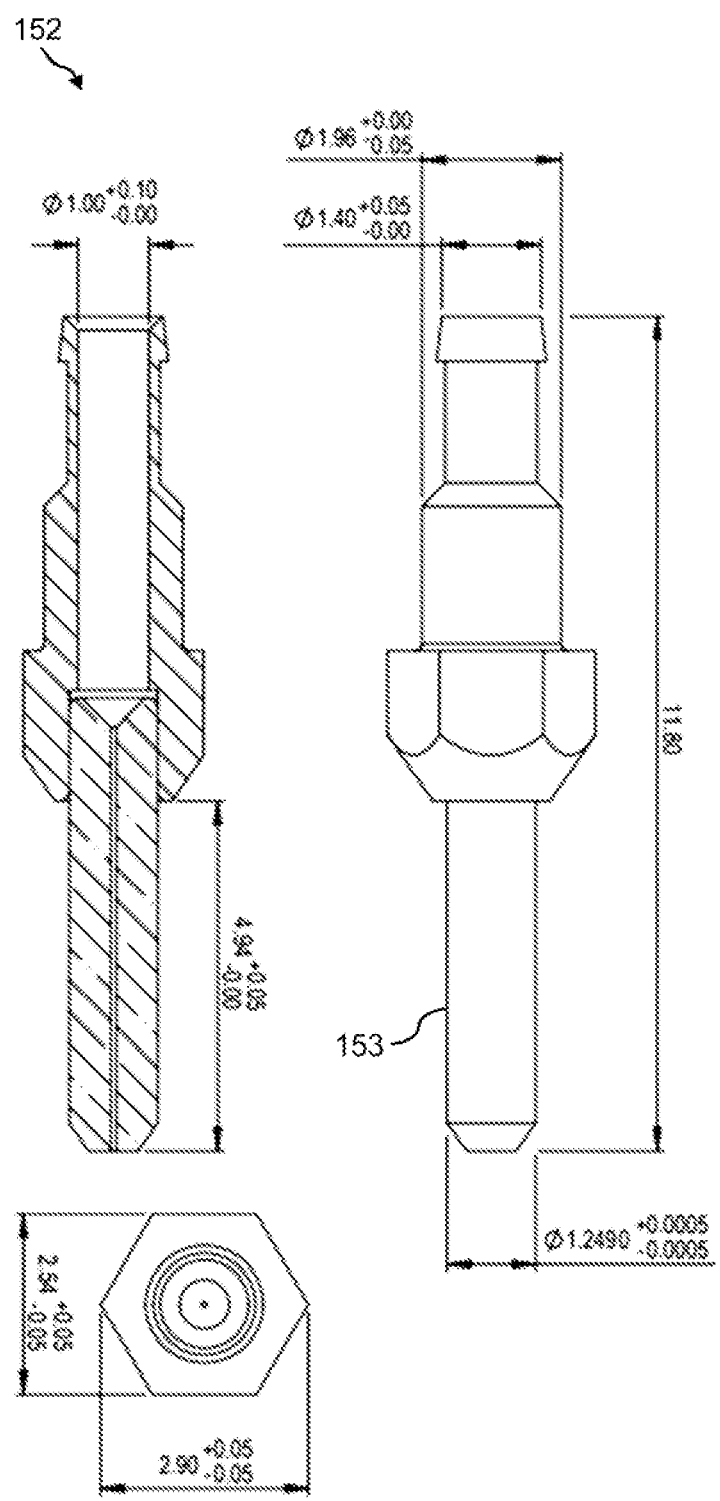
FIG. 8 illustrates various views showing more details of an example of an instrument ferrule of the instrument ferrule assembly shown in FIG. 7A.

In one example, instrument ferrule 152 may be a commercially available ferrule, such as a ferrule available from Precision Fiber Products, Inc (PFP) (Chula Vista, CA), in the family of Part Number: MM-FER2007CF-XXXX. FIG. 8 show various views of an example of the PFP instrument ferrule 152 that may be used in instrument ferrule assembly 124. In this example, instrument ferrule 152 may have an overall length of about 11.80 mm. The outside diameter (OD) of leading tip 153 may be about 1.25 mm. The end face of leading tip 153 may be conical shaped. The bore size of instrument ferrule 152 for receiving optical fiber 154 may be, for example, from about 80 μm to about 126 μm. Further, in instrument ferrule 152, the ferrule material may be, for example, ceramic zirconia (ZrO2) and the flange material may be, for example, nickel plated brass.

In instrument ferrule assembly 124, the OD of optical fiber 154 may be, for example, from about 100 μm to about 125 μm. The OD of cable cladding 155 that surrounds optical fiber 154 may be, for example, about 0.125+0/−0.008 mm.

In instrument ferrule assembly 124, flat washer 156 may be an M2 polyslider washer that is, for example, from about 0.4 mm to about 0.5 mm thick with an OD of about 3.5 mm.

In instrument ferrule assembly 124, spring 158 may be a coiled wire type spring with ground ends.

In instrument ferrule assembly 124 and referring still to FIG. 7A and FIG. 7B, flat washer 156 may be provided against the back of the flange portion of instrument ferrule 152. Then, spring 158 may be provided against the back of flat washer 156. Then, an exposed portion of optical fiber 154 may be inserted into instrument ferrule 152 and advanced to leading tip 153 of instrument ferrule 152. Then, some length of cable cladding 155 engages inside the rear portion of instrument ferrule 152. When instrument ferrule assembly 124 is fully assembled, an end face of optical fiber 154 may be exposed at an opening in the front face of leading tip 153 of instrument ferrule 152. Accordingly, optical fiber 154 of instrument ferrule assembly 124 may be coupled optically to a corresponding optical fiber 146 of a corresponding cartridge ferrule assembly 136. An example of which is shown hereinbelow with reference to FIG. 20 and FIG. 21.

Figure 9A:
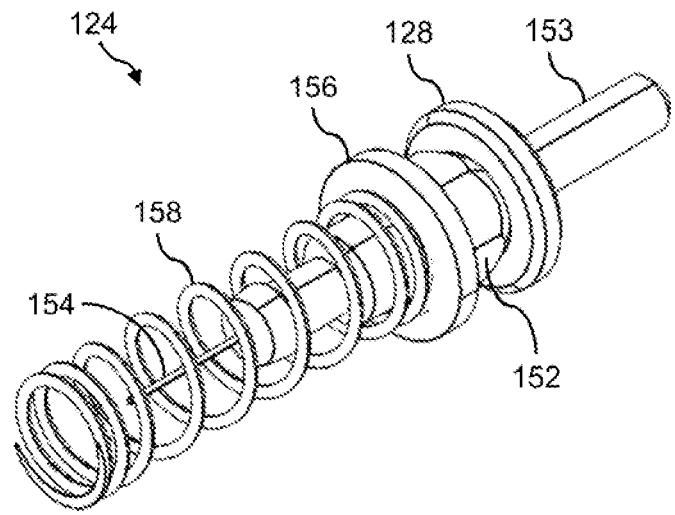
FIG. 9A and FIG. 9B illustrate other perspective views of the instrument ferrule assembly shown in FIG. 7A.
Figure 9B:
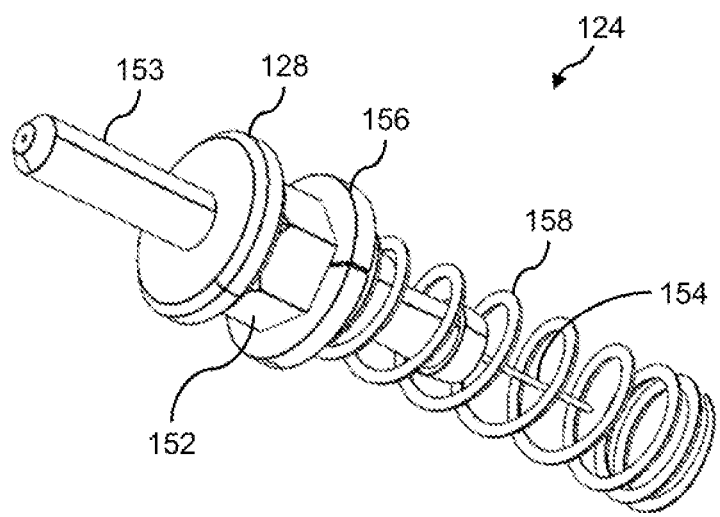
Figure 10:
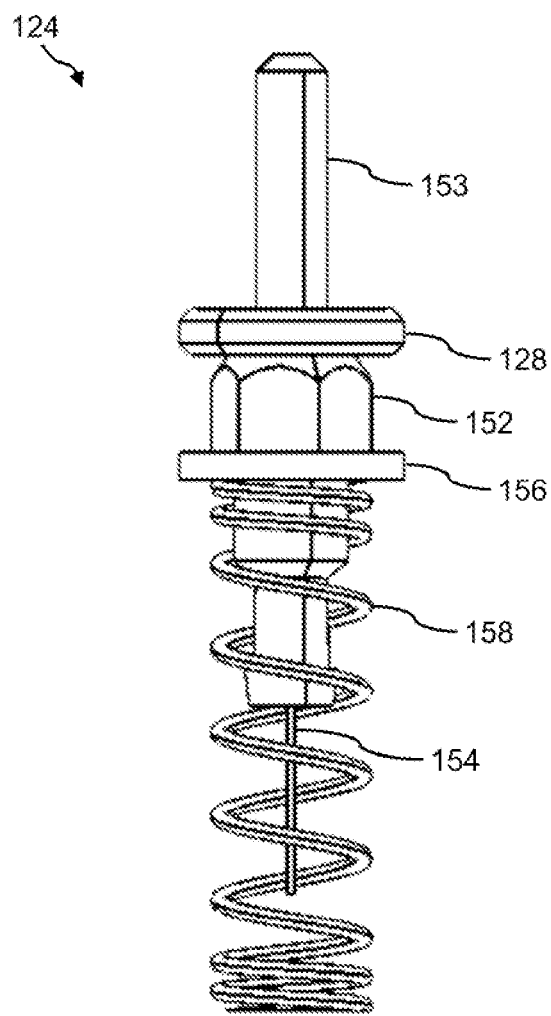
FIG. 10 illustrates a side view of the instrument ferrule assembly shown in FIG. 7A.
Figure 11A:
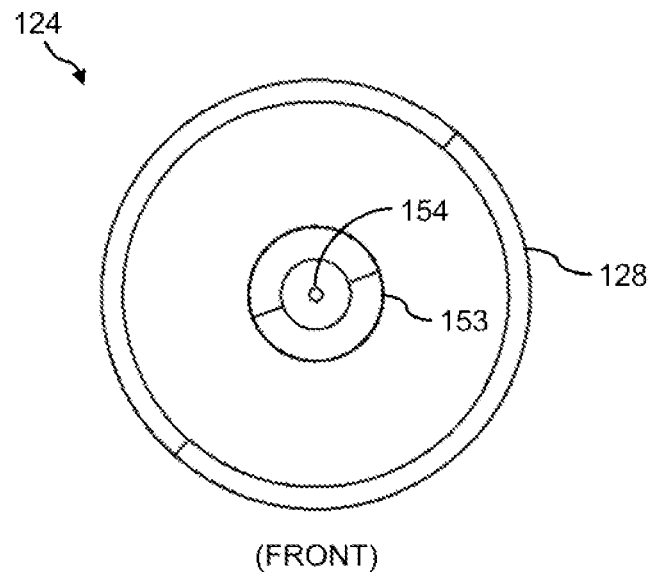
FIG. 11A and FIG. 11B illustrate a front view and a back view, respectively, of the instrument ferrule assembly shown in FIG. 7A.
Figure 11B:
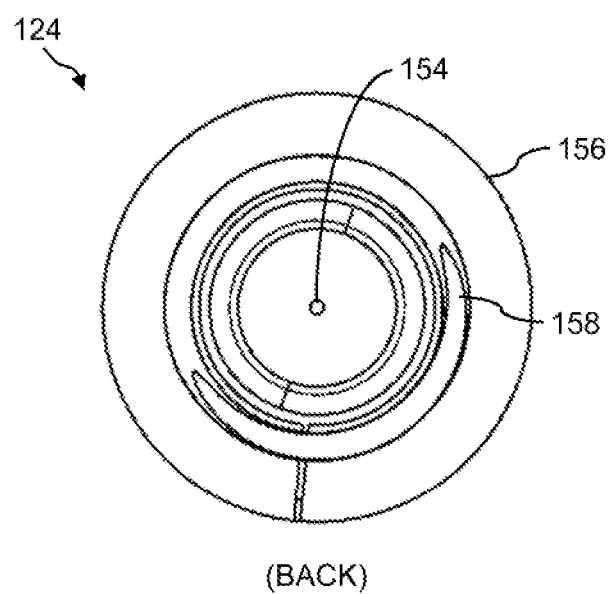

Referring now to FIG. 9A and FIG. 9B is other perspective views of instrument ferrule assembly 124 shown in FIG. 7A. Further, FIG. 10 shows a side view of instrument ferrule assembly 124. Further, FIG. 11A and FIG. 11B shows a front view and a back view, respectively, of instrument ferrule assembly 124. FIG. 9A through FIG. 11B show that instrument ferrule assembly 124 may further include a shoulder washer 128 against the leading face of the flange portion of instrument ferrule 152. That is, shoulder washer 128 may be provided on leading tip 153 of instrument ferrule 152. Shoulder washer 128 may be, for example, an M2 shoulder countersunk washer.

Figure 12:
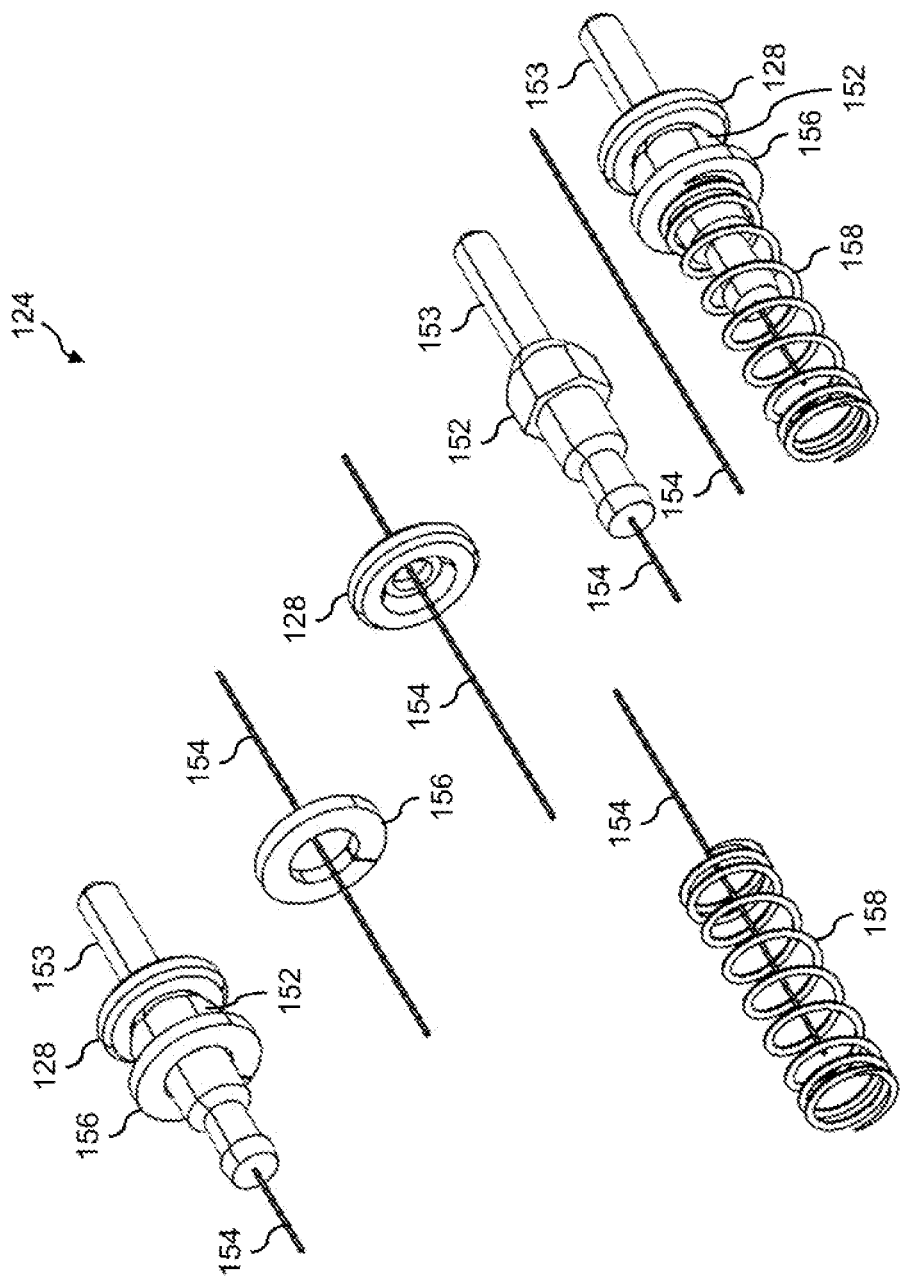
FIG. 12 illustrates perspective views of the instrument ferrule assembly shown in FIG. 7A in various states of assembly.

Referring now to FIG. 12 is perspective views of instrument ferrule assembly 124 shown in FIG. 7A in various states of assembly. For example, instrument ferrule assembly 124 is shown absent spring 158. Flat washer 156 is shown alone in relation to optical fiber 154. Shoulder washer 128 is shown alone in relation to optical fiber 154. Instrument ferrule 152 is shown alone in relation to optical fiber 154. Spring 158 is shown alone in relation to optical fiber 154. Optical fiber 154 is shown alone. Then, instrument ferrule assembly 124 is shown fully assembled.

Referring now to FIG. 13 and FIG. 14 is a perspective view and an exploded view, respectively, of an example of instrument fiber optic coupler 112 of the presently disclosed self-aligning optical fiber system 110 shown in FIG. 1 through FIG. 6. FIG. 13 and FIG. 14 show that instrument fiber optic coupler 112 may further include a coupler clamp plate 120 for holding the multiple instrument ferrule assemblies 124 secure to coupler housing 116. Further, coupler clamp plate 120 may be secured to coupler housing 116 via multiple screws 126.

Figure 15A:
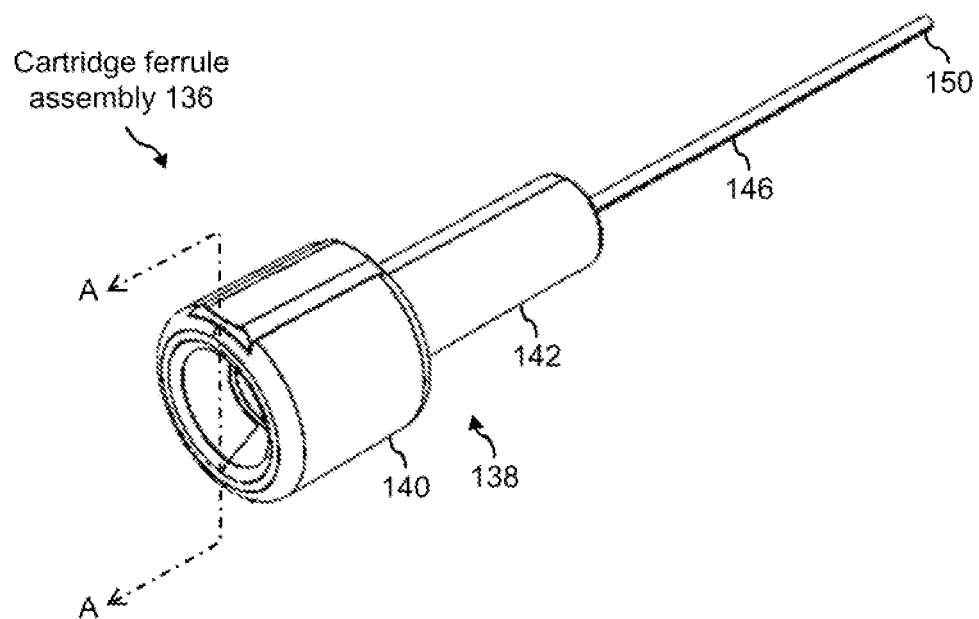
FIG. 15A illustrates a perspective view of an example of a cartridge ferrule assembly of the cartridge fiber optic connector of the presently disclosed self-aligning optical fiber system shown in FIG. 1 through FIG. 6.

Referring now to FIG. 15A is a perspective view of an example of cartridge ferrule assembly 136 of cartridge fiber optic connector 114 of the presently disclosed self-aligning optical fiber system 110 shown in FIG. 1 through FIG. 6. In this example, cartridge ferrule assembly 136 may include cartridge ferrule 138 and optical fiber 146. Cartridge ferrule 138 may further include a receiving end 140 and a fiber holder end 142. Receiving end 140 of cartridge ferrule 138 may be cup-shaped and sized for receiving leading tip 153 of instrument ferrule 152 of instrument ferrule assembly 124.

In cartridge ferrule assembly 136, the OD of optical fiber 146 may be, for example, from about 200 μm to about 230 μm. The OD of the cable cladding (not shown) that surrounds optical fiber 146 may be, for example, about 0.23+0/−0.008 mm.

Figure 15B:
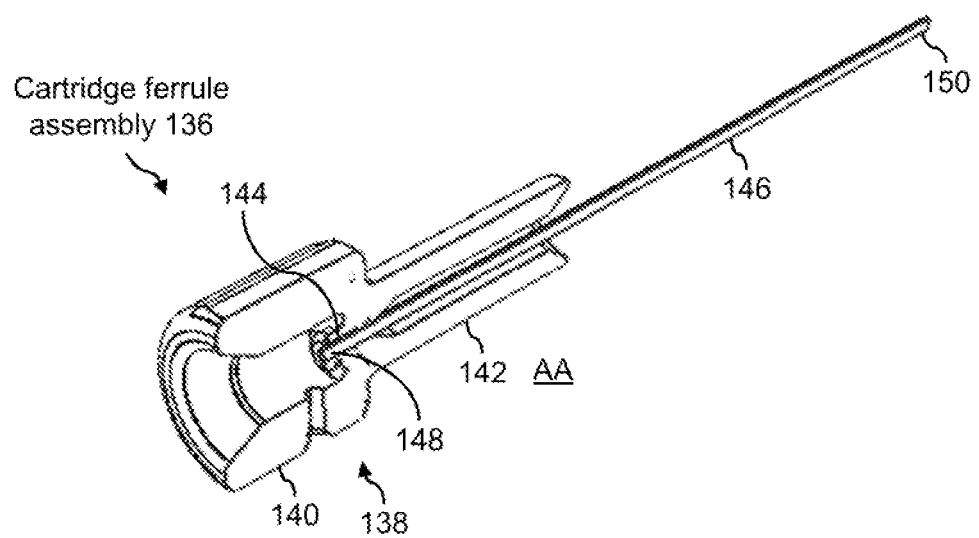
FIG. 15B illustrates a perspective cross-sectional view of the cartridge ferrule assembly shown in FIG. 15A.

Optical fiber 146 may have a proximal end 148 and distal end 150. Proximal end 148 of optical fiber 146 may be fitted into a fiber centering channel 144 at receiving end 140 of cartridge ferrule 138, as shown in FIG. 15B, which is a cross-sectional view of cartridge ferrule assembly 136 taken along line A-A of FIG. 15A. A length of optical fiber 146 runs through fiber holder end 142 of cartridge ferrule 138 and with distal end 150 of optical fiber 146 extending outward away from fiber holder end 142.

Figures 16A, 16B:
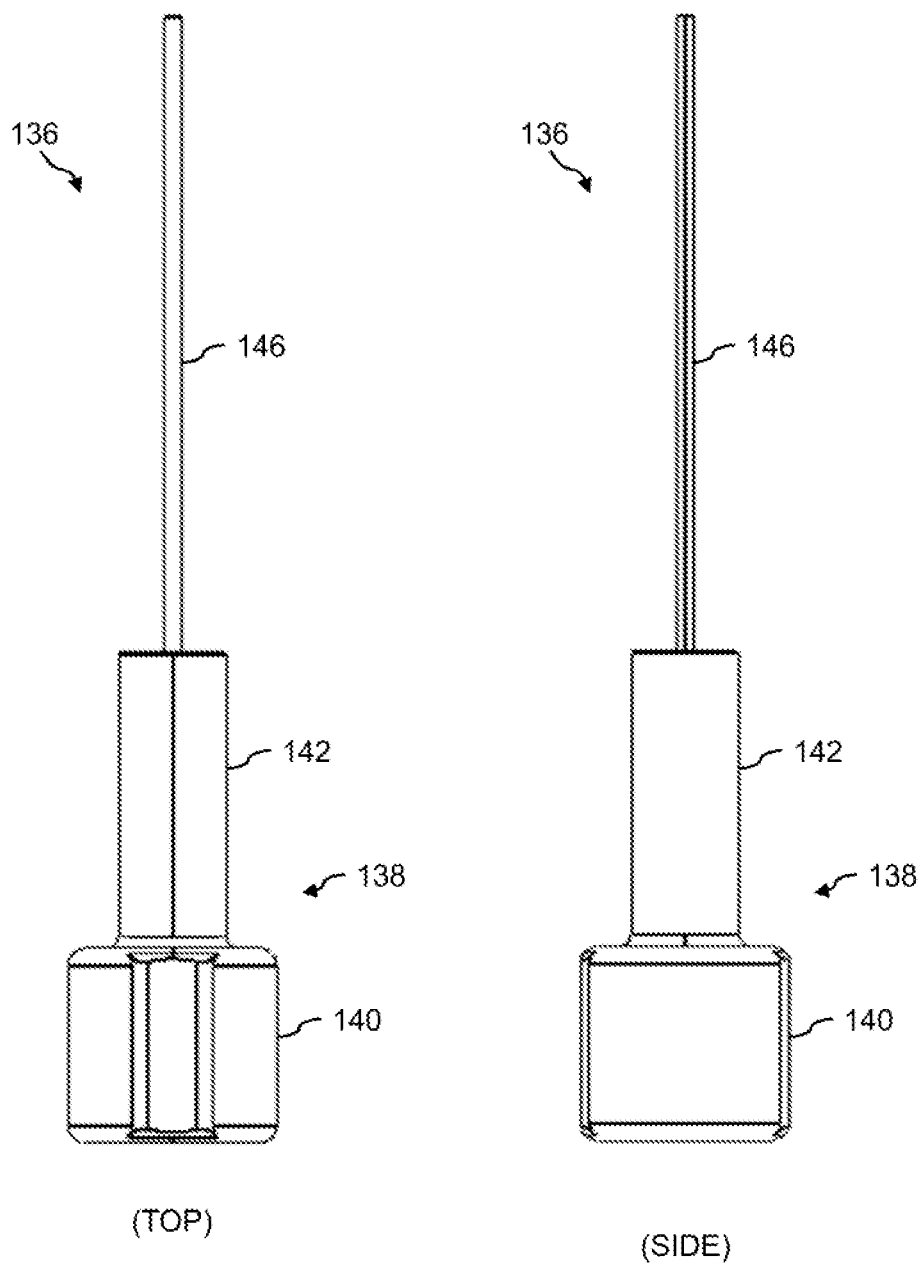
FIG. 16A and FIG. 16B illustrate a top view and a side view, respectively, of the cartridge ferrule assembly shown in FIG. 15A.
Figure 17A:
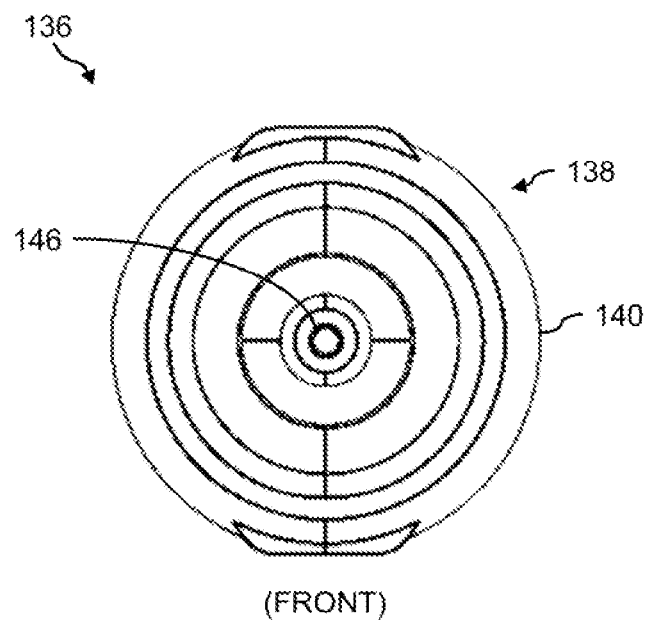
FIG. 17A and FIG. 17B illustrate a front view and a back view, respectively, of the cartridge ferrule assembly shown in FIG. 15A.
Figure 17B:
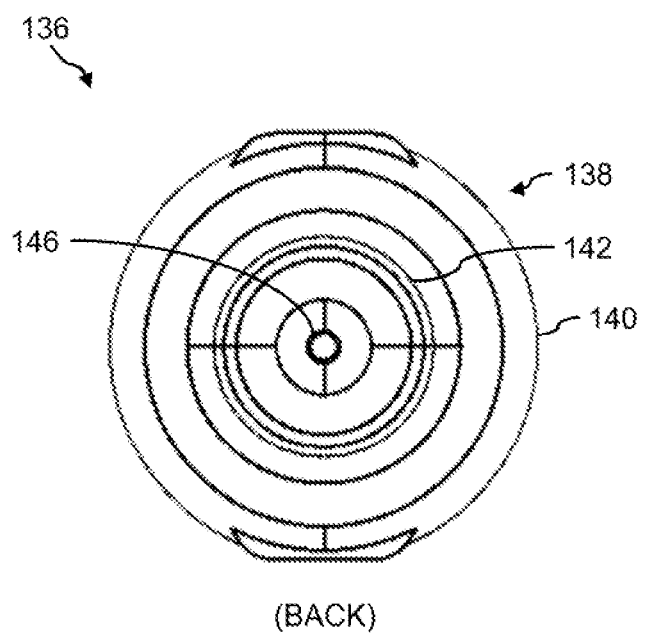
Figure 18:
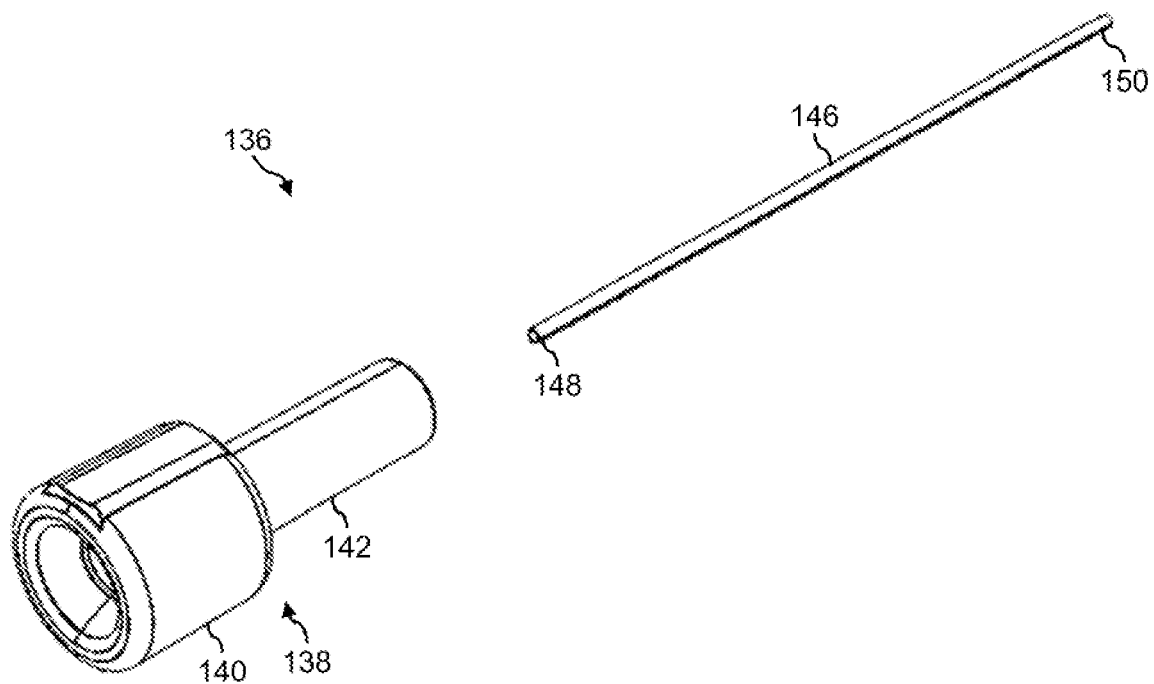
FIG. 18 illustrates an exploded view of the cartridge ferrule assembly shown in FIG. 15A.

Additionally, FIG. 16A and FIG. 16B shows a top view and a side view, respectively, of cartridge ferrule assembly 136. Further, FIG. 17A and FIG. 17B shows a front view and a back view, respectively, of cartridge ferrule assembly 136. Further, FIG. 18 shows an exploded view of cartridge ferrule assembly 136.

Figure 19:
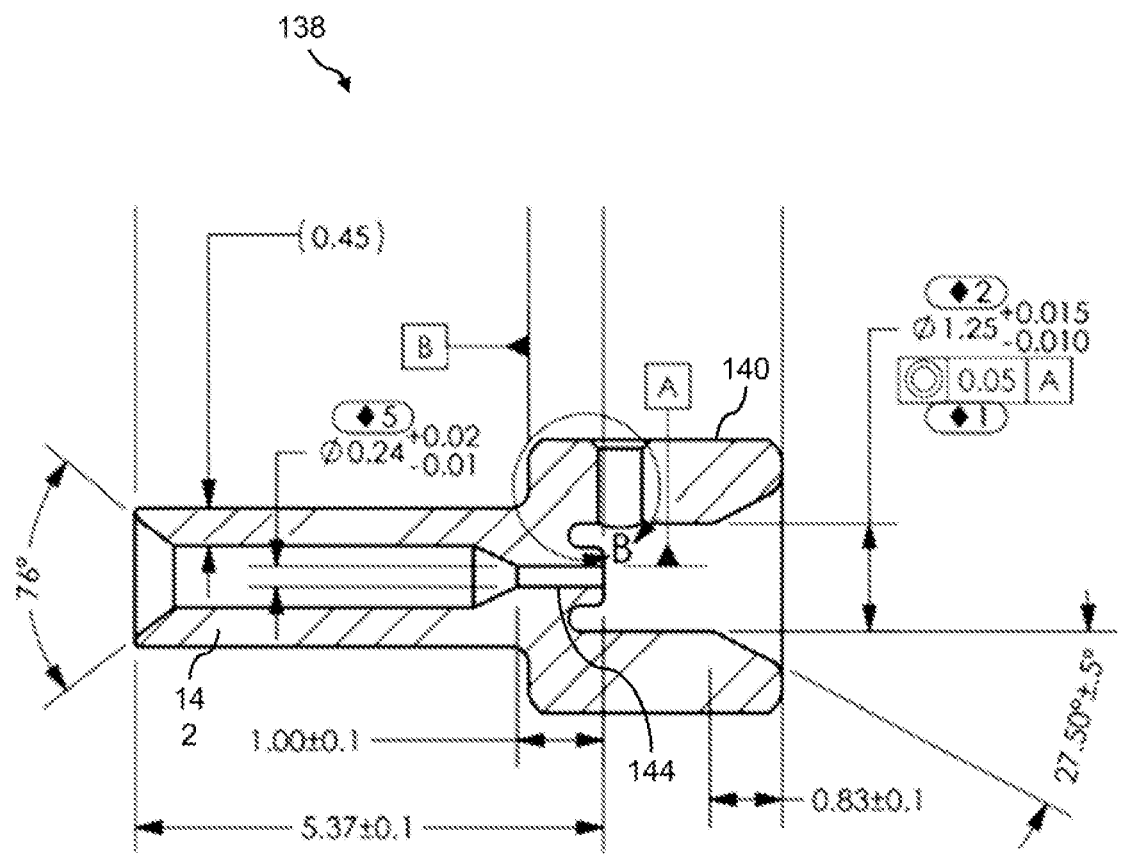
FIG. 19 illustrates a cross-sectional view showing more details of an example of the cartridge ferrule of the cartridge ferrule assembly shown in FIG. 15A.

Referring now to FIG. 19 is a cross-sectional view showing more details of an example of cartridge ferrule 138 of cartridge ferrule assembly 136 shown in FIG. 15A. In this example, the overall length of cartridge ferrule 138 may be about 7.4 mm. The overall diameter of receiving end 140 of cartridge ferrule 138 may be about 3.1 mm. The ID of receiving end 140 of cartridge ferrule 138 may be about 1.25 mm. The overall cross-section of fiber holder end 142 of cartridge ferrule 138 may be about 1.6 mm. The ID of fiber holder end 142 of cartridge ferrule 138 may be about 2 mm. The ID of fiber centering channel 144 leading into receiving end 140 of cartridge ferrule 138 may be about 0.23 mm.

Additionally, a lead-in bevel or chamfer may be provided at the openings of both receiving end 140 and fiber holder end 142 of cartridge ferrule 138. The lead-in bevel or chamfer may be used to provide a generous lead-in of, for example, from about 0.8 mm to about 0.9 mm during the mating between leading tip 153 of instrument ferrule 152 and receiving end 140 of cartridge ferrule 138 during alignment.

Fiber centering channel 144 is designed to hold proximal end 148 of optical fiber 146. When instrument ferrule assembly 124 is fully assembled, an end face of optical fiber 146 may be exposed at an opening in the floor of receiving end 140 of cartridge ferrule 138. Accordingly, optical fiber 146 of cartridge ferrule assembly 136 may be coupled optically to a corresponding optical fiber 154 of a corresponding instrument ferrule assembly 124. That is, an optical fiber 146 of a cartridge ferrule assembly 136 and an optical fiber 154 of an instrument ferrule assembly 124 may come face-to-face or end-to-end inside the cup-shaped receiving end 140 of cartridge ferrule 138. An example of which is shown hereinbelow with reference to FIG. 20 and FIG. 21.

Figure 20:
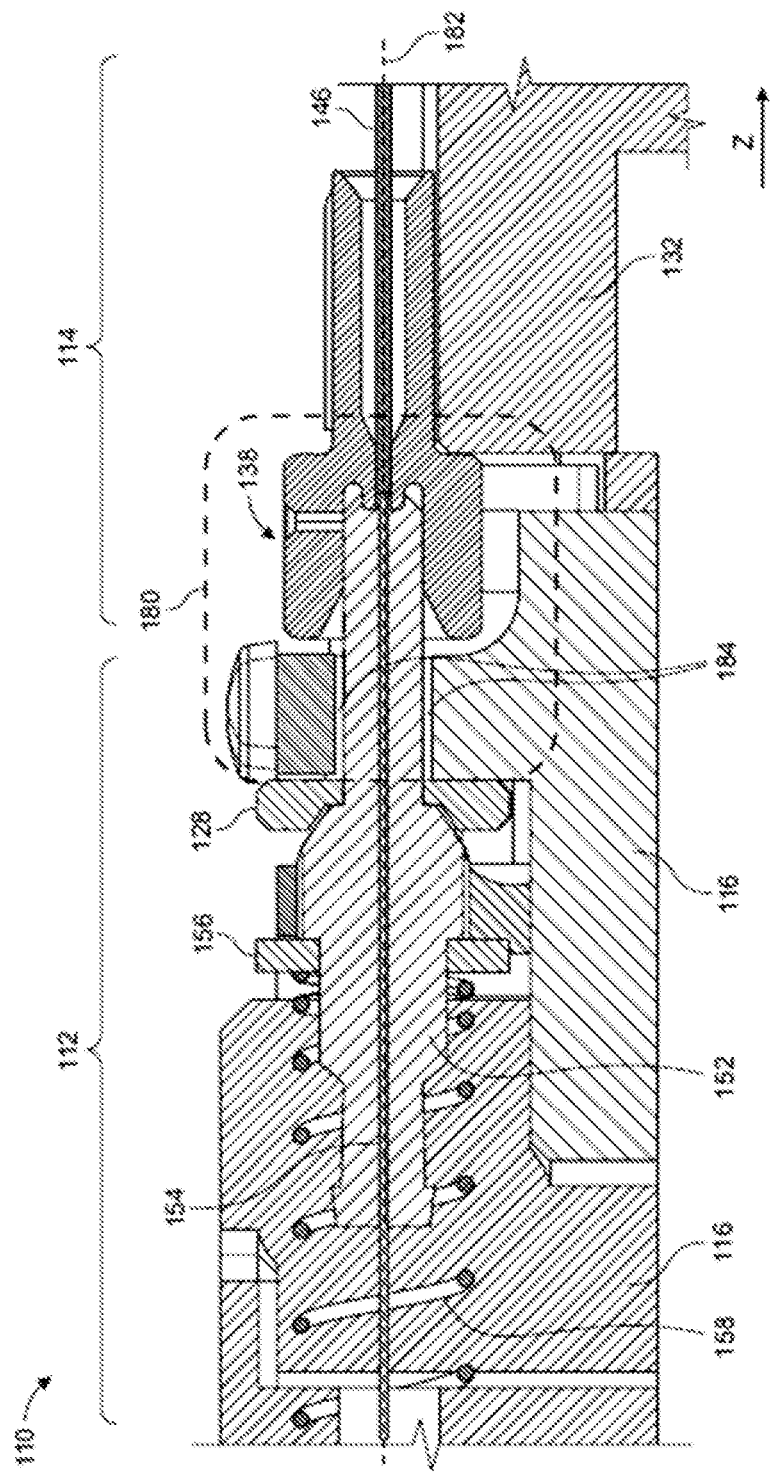
FIG. 20 and FIG. 21 illustrate cross-sectional views of a portion of the presently disclosed self-aligning optical fiber system shown in FIG. 1 through FIG. 6 and showing the instrument fiber optic coupler and the cartridge fiber optic connector fully engaged together.
Figure 21:
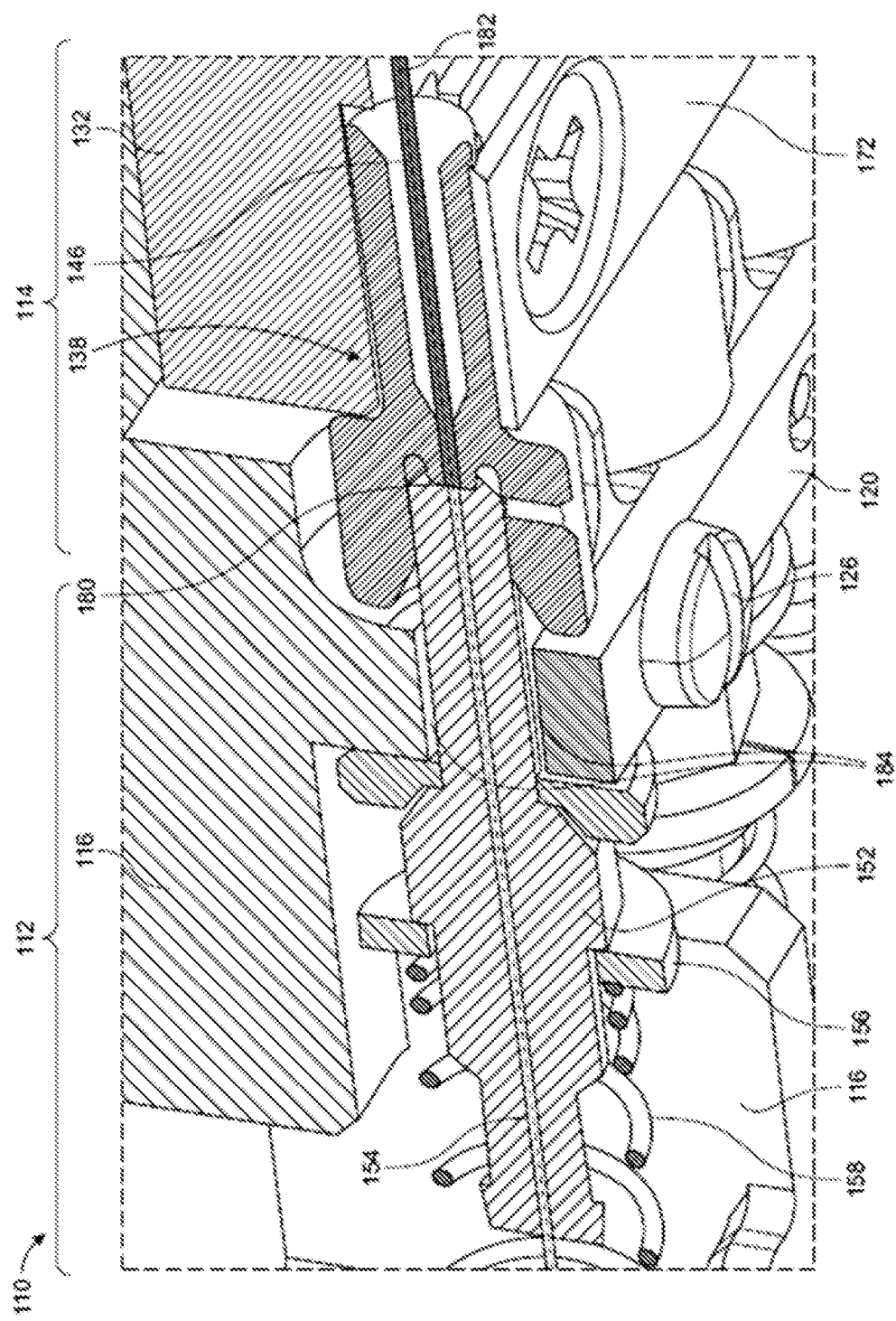

Referring now to FIG. 20 and FIG. 21 is cross-sectional views of a portion of the presently disclosed self-aligning optical fiber system 110 shown in FIG. 1 through FIG. 6 and showing instrument fiber optic coupler 112 and cartridge fiber optic connector 114 fully engaged together.

In self-aligning optical fiber system 110, the OD of optical fiber 146 of cartridge ferrule assembly 136 may be larger than the OD of optical fiber 154 of instrument ferrule assembly 124. For example, the OD of optical fiber 146 may be from about 200 μm to about 230 μm, while the OD of optical fiber 154 may be from about 100 μm to about 125 μm. This allows a certain tolerance for the end of optical fiber 154 of instrument ferrule assembly 124 aligning with and matching up with the end of optical fiber 146 of cartridge ferrule assembly 136. In self-aligning optical fiber system 110, this configuration with respect to optical fibers 146 and 154 provides an alignment tolerance of better than about +/−50 μm.

Again, in microfluidics system 100, instrument fiber optic coupler 112 of microfluidics instrument 160 and cartridge fiber optic connector 114 of microfluidics instrument 160 may engage and align in two stages: (1) a course alignment stage that aligns instrument fiber optic coupler 112 to cartridge fiber optic connector 114 and (2) a fine alignment stage that aligns individually each optical channel of instrument fiber optic coupler 112 and cartridge fiber optic connector 114. As previously described, dowel pins 118 of align instrument fiber optic coupler 112 may be used to perform the coarse alignment stage of instrument fiber optic coupler 112 to cartridge fiber optic connector 114, which is the first of the two stages.

As shown in FIG. 20 and FIG. 21, the process of engaging leading tip 153, which is carrying optical fiber 154, of instrument ferrule 152 of instrument ferrule assembly 124 with receiving end 140 of cartridge ferrule 138 of cartridge ferrule assembly 136 may be used to perform the second of the two stages, which is the fine alignment stage of instrument fiber optic coupler 112 to cartridge fiber optic connector 114. In this fine alignment stage, optical fibers 154 of instrument fiber optic coupler 112 may be aligned (end-to-end or face-to-face) to within about +/−50 μm of optical fibers 146 of cartridge fiber optic connector 114.

FIG. 20 and FIG. 21 show a Z-direction alignment and coupling region 180. Further, the alignment of optical fiber 154 of instrument fiber optic coupler 112 to optical fiber 146 of cartridge fiber optic connector 114 in Z-direction alignment and coupling region 180 forms an optical channel 182 of microfluidics system 100. Further, the spring load compression of spring 158 of instrument ferrule assembly 124 of instrument fiber optic coupler 112 allows instrument ferrule 152 and cartridge ferrule 138 to overlap in the z-direction and allows the fiber ends to mate face-to-face substantially without leaving any gap therebetween.

Additionally, while cartridge ferrule 138 may be clamped down using a plate with screw mount, instrument ferrule 152 may be allowed to float by leaving a gap 184 between coupler clamp plate 120 and instrument ferrule 152. Coupler clamp plate 120 allows installation of instrument ferrule 152, prevents instrument ferrule 152 from falling out during transportation, and limits the play in the float. The floating instrument ferrule 152 creates the compliance system that allows individual self-aligning ferrules between microfluidics cartridge 170 and microfluidics instrument 160.

In some embodiments, an optic gel may be applied over the ferrules interface between the ends of the mating two optical fibers 146 and 154. This, coupled with the z-direction overlap with the spring load compression of spring 158, may be used to ensure the quality of the optic transmission. A recessed ring (not shown) around the mating surface of cartridge ferrule 138 and a vent hole may allow the optic gel and trapped air to escape during the mating operation.

Figure 22:
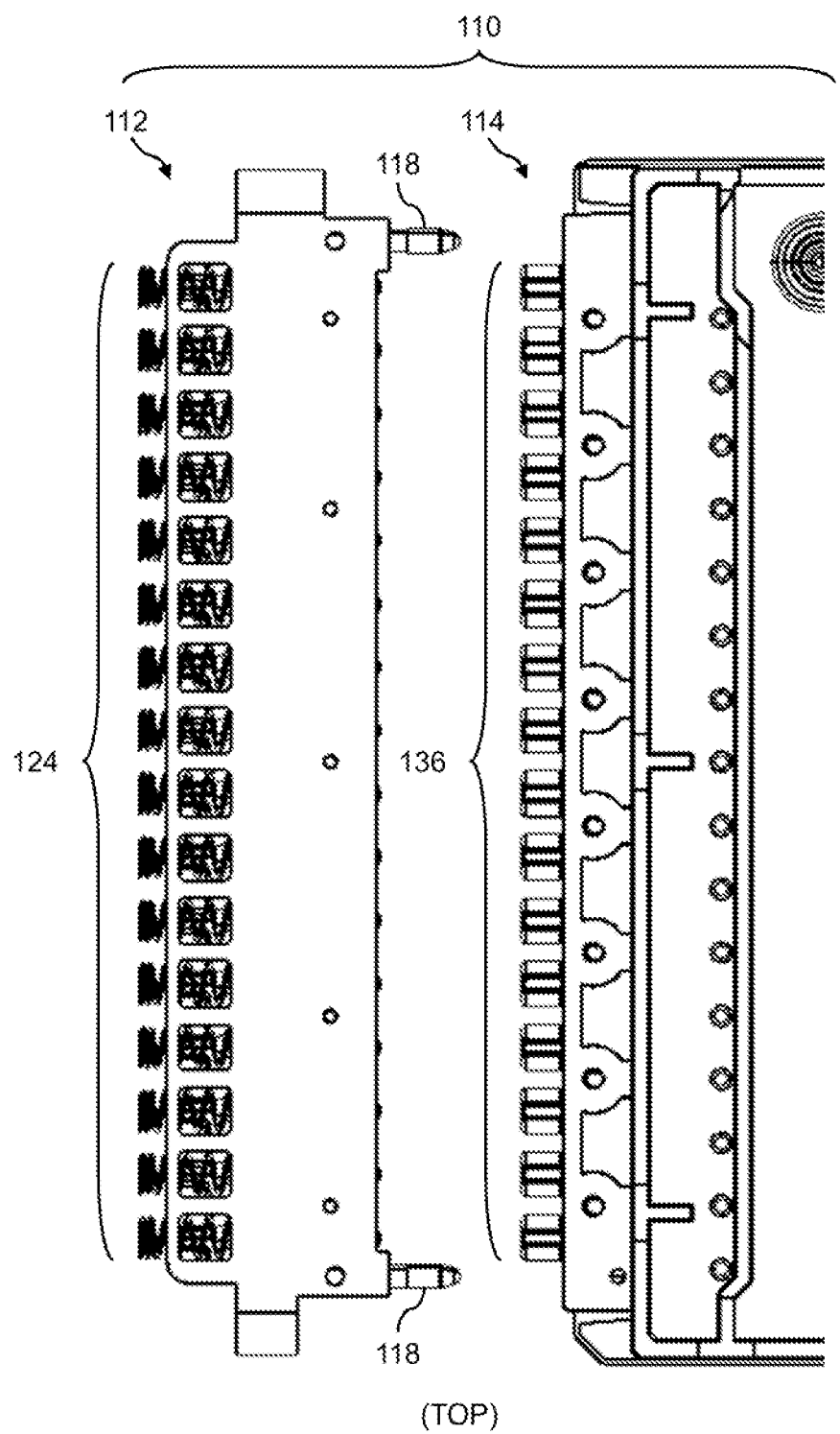
FIG. 22 and FIG. 23 illustrate top views of the instrument fiber optic coupler in relation to the cartridge fiber optic connector of the presently disclosed self-aligning optical fiber system shown in FIG. 1 through FIG. 6.
Figure 23:
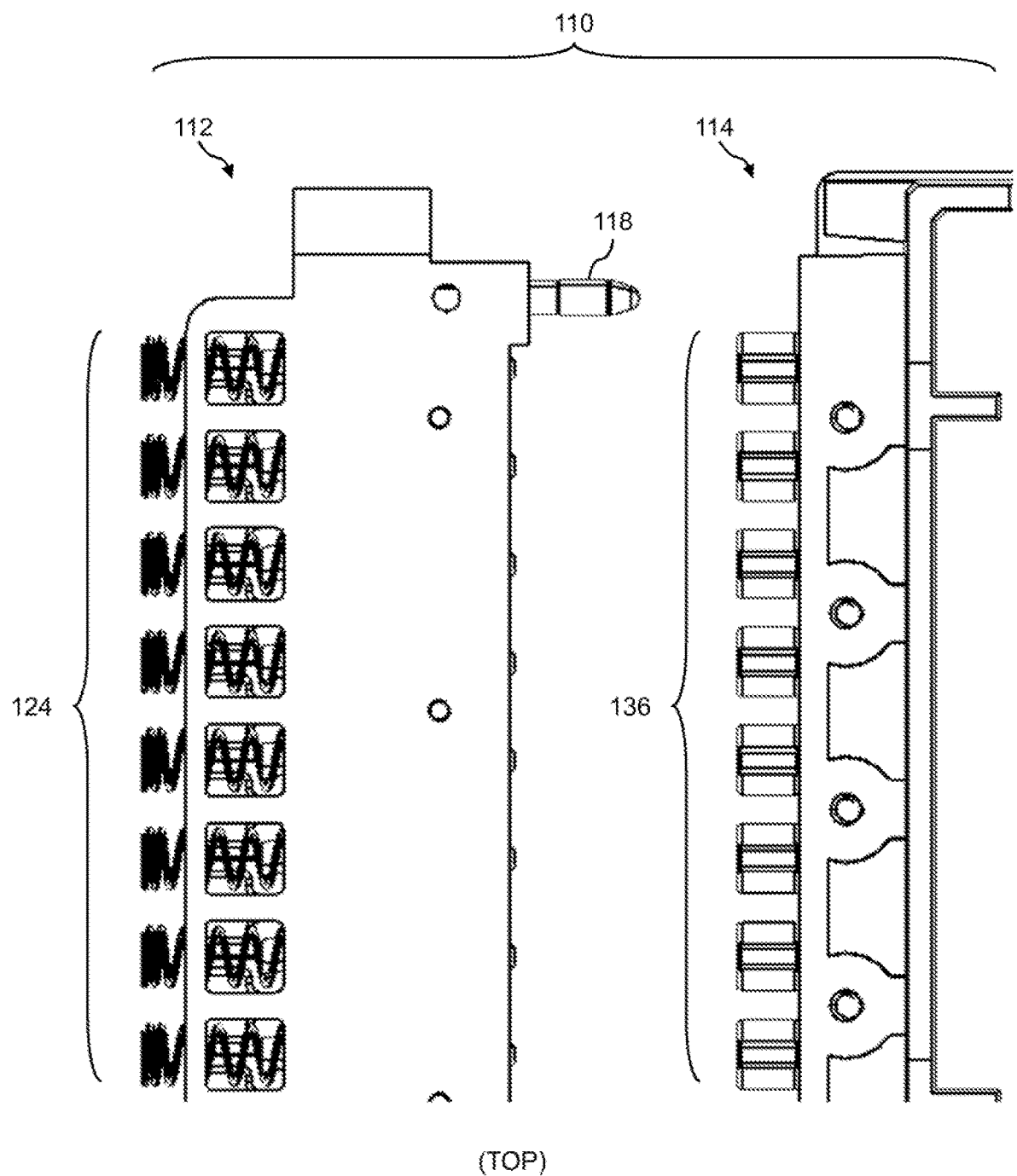
Figure 24:
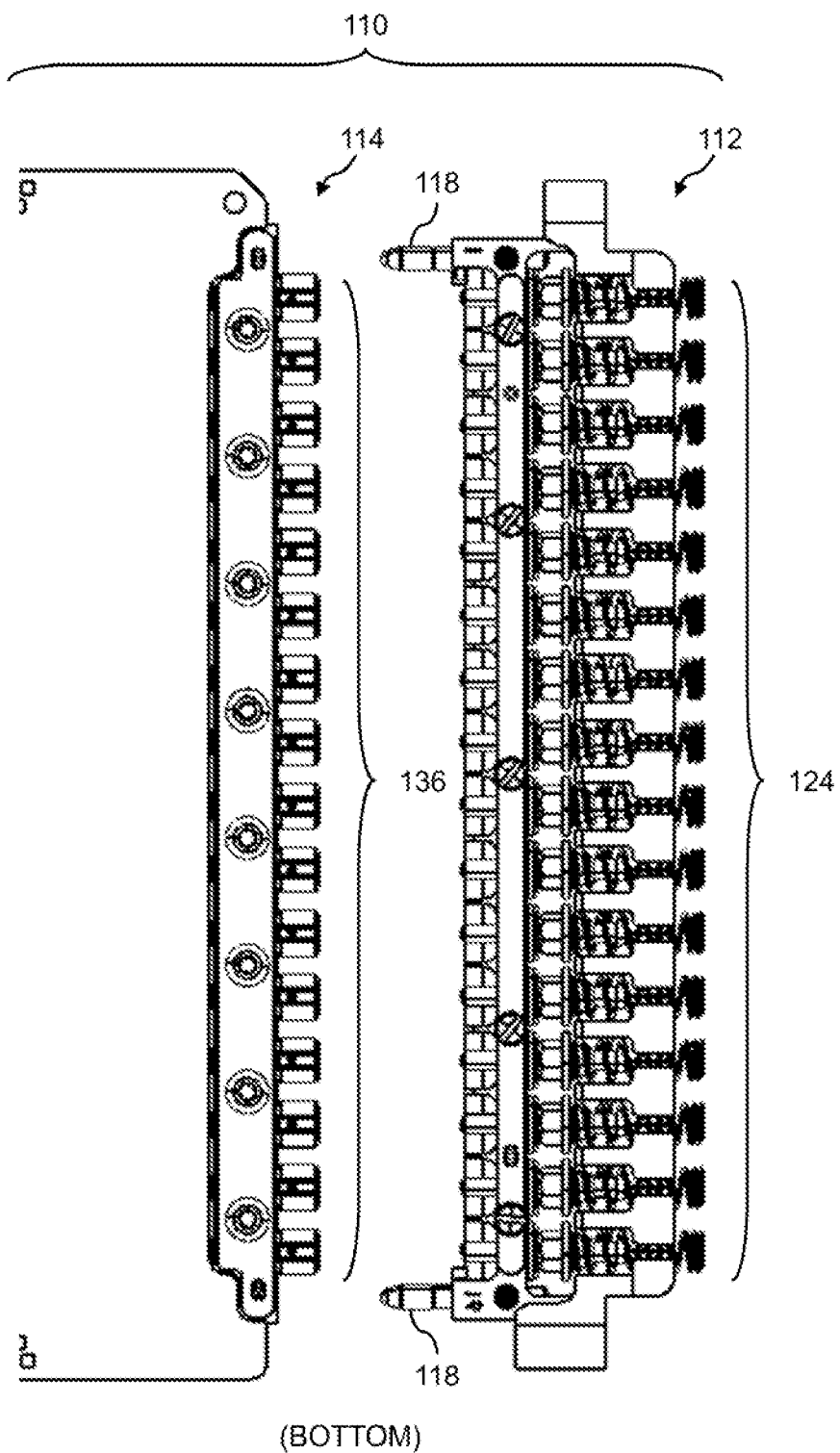
FIG. 24 and FIG. 25 illustrate bottom views of the instrument fiber optic coupler in relation to the cartridge fiber optic connector of the presently disclosed self-aligning optical fiber system shown in FIG. 1 through FIG. 6.
Figure 25:
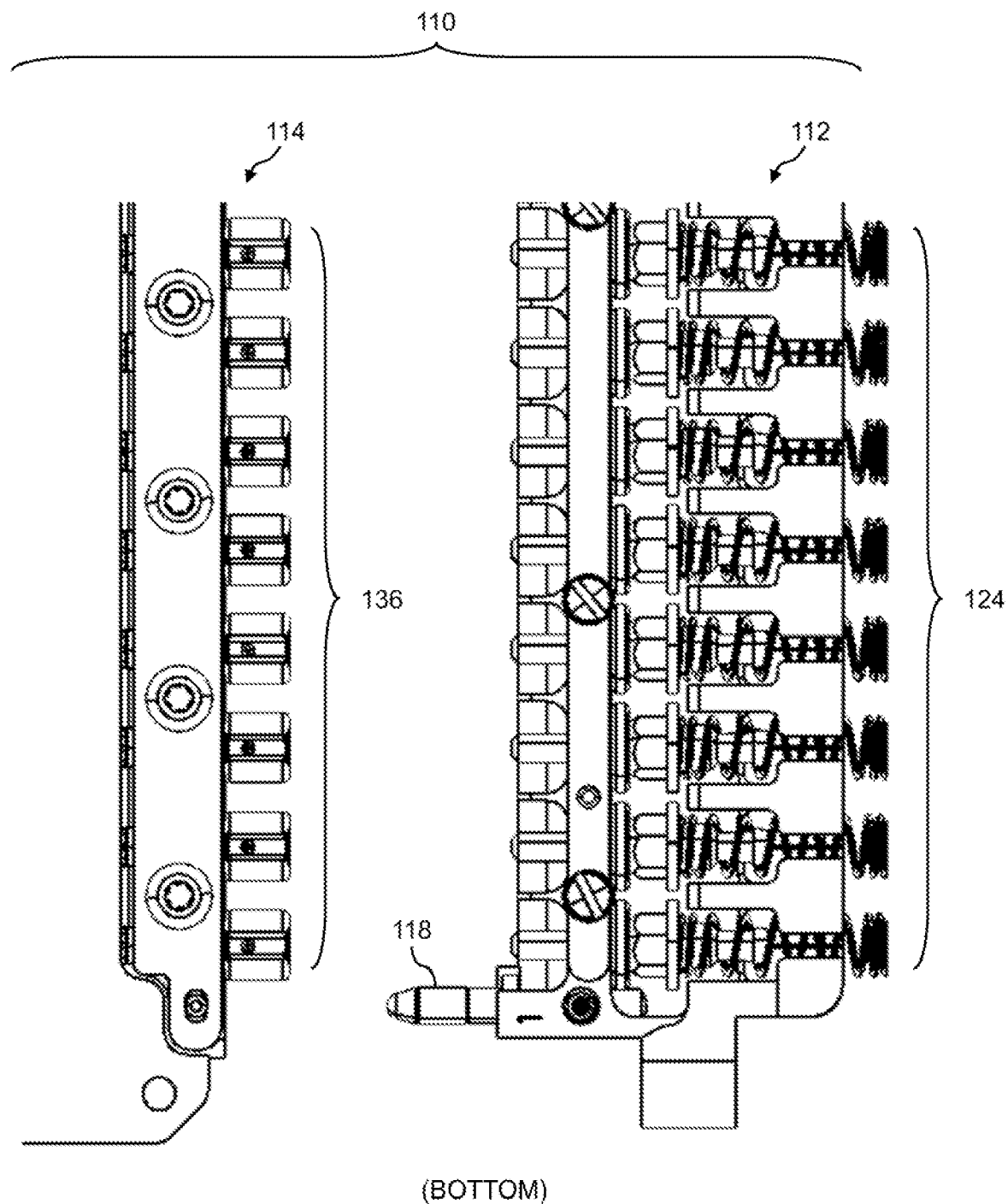

Referring now to FIG. 22 and FIG. 23 is top views of instrument fiber optic coupler 112 in relation to cartridge fiber optic connector 114 of the presently disclosed self-aligning optical fiber system 110 shown in FIG. 1 through FIG. 6. Further, FIG. 24 and FIG. 25 is bottom views of instrument fiber optic coupler 112 in relation to cartridge fiber optic connector 114 of the presently disclosed self-aligning optical fiber system 110.

Figure 26:
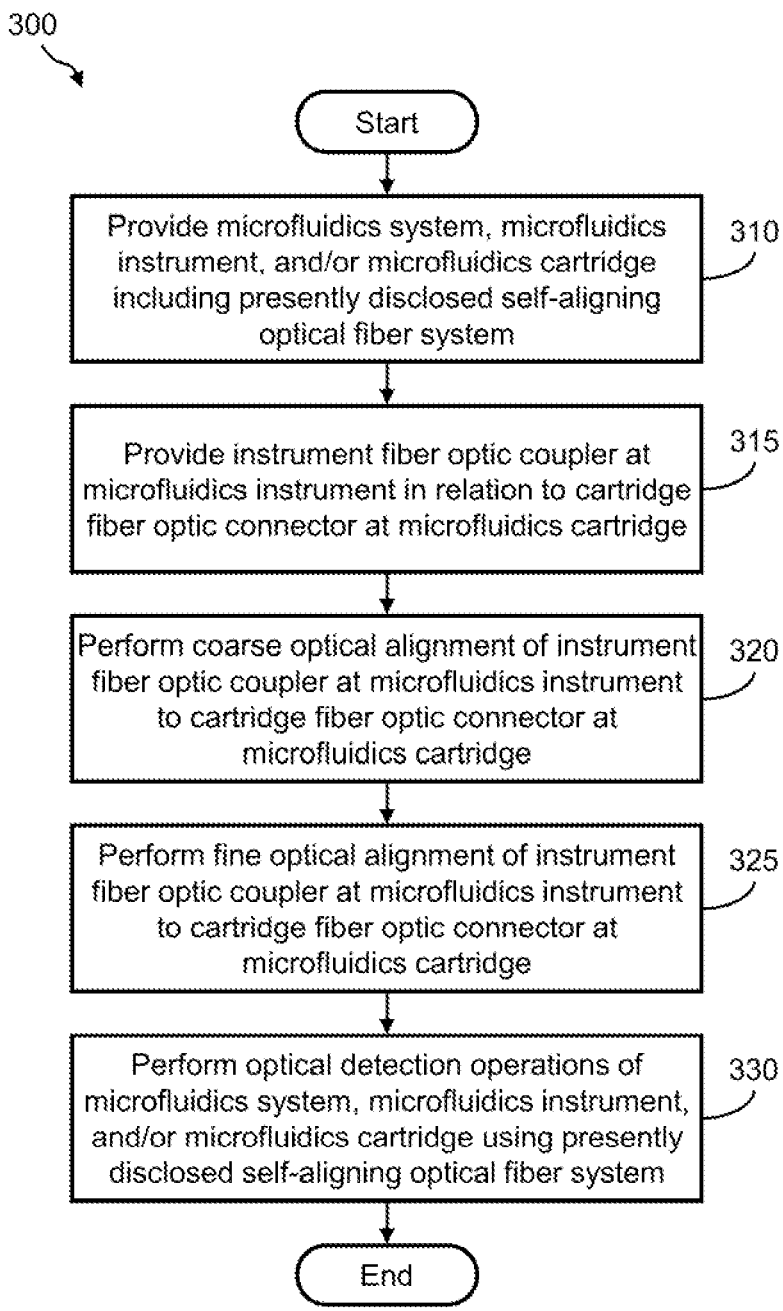
FIG. 26 illustrates a flow diagram of an example of a method of using of the presently disclosed microfluidics system including the self-aligning optical fiber system shown in FIG. 1 through FIG. 25.

Referring now to FIG. 26 is a flow diagram of an example of a method 300 of using of the presently disclosed microfluidics system 100 including self-aligning optical fiber system 110 shown in FIG. 1 through FIG. 25. Method 300 may include, but is not limited to, the following steps.

At a step 310, the microfluidics system, microfluidics instrument, and/or microfluidics cartridge including the presently disclosed self-aligning optical fiber system is provided. For example, microfluidics system 100 may be provided that includes microfluidics instrument 160, microfluidics cartridge 170, and including the presently disclosed self-aligning optical fiber system 110, as shown and described hereinabove with reference to FIG. 1 through FIG. 25.

At a step 315, an instrument fiber optic coupler at the microfluidics instrument is provided in relation to the cartridge fiber optic connector at the microfluidics cartridge. For example, in self-aligning optical fiber system 110, instrument fiber optic coupler 112 at microfluidics instrument 160 is provided in relation to cartridge fiber optic connector 114 at microfluidics cartridge 170.

At a step 320, the first, or coarse optical alignment step of the instrument fiber optic coupler at the microfluidics instrument to the cartridge fiber optic connector at the microfluidics cartridge is performed. For example, the coarse optical alignment step of instrument fiber optic coupler 112 at microfluidics instrument 160 to cartridge fiber optic connector 114 at microfluidics cartridge 170 is performed. For example, movable slide mechanism 164 of microfluidics instrument 160 to may be used to translate instrument fiber optic coupler 112 toward a stationary cartridge fiber optic connector 114 at microfluidics cartridge 170. In so doing, the course alignment step uses dowel pins 118 for the initial engagement and alignment of instrument fiber optic coupler 112 to cartridge fiber optic connector 114. In this course alignment step, optical fibers 154 of instrument fiber optic coupler 112 may be aligned (end-to-end or face-to-face) to within about +/−0.7 mm of optical fibers 146 of cartridge fiber optic connector 114.

At a step 325, the second, or fine optical alignment step of the instrument fiber optic coupler at the microfluidics instrument to the cartridge fiber optic connector at the microfluidics cartridge is performed. For example, movable slide mechanism 164 of microfluidics instrument 160 to may be used to continue translating instrument fiber optic coupler 112 toward a stationary cartridge fiber optic connector 114 at microfluidics cartridge 170. In so doing, the fine optical alignment step may be accomplished by fully engaging instrument ferrule 152 (with optical fibers 154) of instrument ferrule assembly 124 with cartridge ferrule 138 (with optical fibers 146) of cartridge ferrule assembly 136. In this fine alignment step, optical fibers 154 of instrument fiber optic coupler 112 may be aligned (end-to-end or face-to-face) to within about +/−50 μm of optical fibers 146 of cartridge fiber optic connector 114.

At a step 330, the optical detection operations of the microfluidics system, microfluidics instrument, and/or microfluidics cartridge using presently disclosed self-aligning optical fiber system are performed. For example, the optical detection operations of microfluidics system 100, microfluidics instrument 160, and/or microfluidics cartridge 170 using presently disclosed self-aligning optical fiber system 110 may be performed. For example, microfluidics cartridge 170 may be used to perform DMF operations (or droplet operations) with respect to processing of biological materials. In these processes, optical detection operations may occur wherein self-aligning optical fiber system 110 provides the optical pathways or channels from detection spots 178 of microfluidics cartridge 170 to optical detection system 162 of microfluidics instrument 160.

Referring now again to FIG. 1 through FIG. 26, the presently disclosed microfluidics system 100, microfluidics instrument 160, microfluidics cartridge 170, and method 300 may provide self-aligning optical fiber system 110 that may include instrument fiber optic coupler 112 on the microfluidics instrument side of microfluidics system 100 and cartridge fiber optic connector 114 on the microfluidics cartridge side of microfluidics system 100.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 ensure a good optical mate (about <10 um spacing, about <100 um concentricity deviation) therebetween.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 may support any number of optical detection channels, such as, but not limited to, sixteen (16) optical detection channels.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 may engage and align in two stages: (1) a course alignment stage that aligns instrument fiber optic coupler 112 to cartridge fiber optic connector 114 and (2) a fine alignment stage that aligns individually each optical channel of instrument fiber optic coupler 112 and cartridge fiber optic connector 114.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 may include a line or arrangement of multiple (e.g., sixteen) instrument ferrule assemblies 124 and wherein each of the instrument ferrule assemblies 124 may include an off-the-shelf ferrule.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 may include a line or arrangement of multiple (e.g., sixteen) cartridge ferrule assemblies 136 and wherein each of the cartridge ferrule assemblies 136 may include a cup-shaped custom cartridge ferrule 138 that is designed to accept the off-the-shelf ferrule of the instrument ferrule assemblies 124 and implements the optical fiber fine alignment.

Referring now again to FIG. 1 through FIG. 26, the presently disclosed microfluidics system 100, microfluidics instrument 160, microfluidics cartridge 170, and method 300 may provide self-aligning optical fiber system 110 in which the tolerance for aligning a line of multiple optical fibers across some distance lies substantially entirely in each individual mating of one instrument ferrule assembly 124 to one cartridge ferrule assembly 136, not in the collective arrangement of, for example, sixteen instrument ferrule assemblies 124 mating to sixteen cartridge ferrule assemblies 136 across some distance.

Referring now again to FIG. 1 through FIG. 26, the presently disclosed microfluidics system 100, microfluidics instrument 160, microfluidics cartridge 170, and method 300 may provide self-aligning optical fiber system 110 in which instrument fiber optic coupler 112 on the microfluidics instrument side of microfluidics system 100 and cartridge fiber optic connector 114 on the microfluidics cartridge side of microfluidics system 100 may be used for aligning a series of optical fibers (e.g., sixteen) in the cartridge fiber optic connector 114 simultaneously onto the same number of optical fibers (e.g., sixteen) in the instrument ferrule assemblies 124 to transmit the optic result concurrently through the established optical channels for diagnostics in the microfluidics system 100 and/or microfluidics instrument 160.

Referring now again to FIG. 1 through FIG. 26, microfluidics system 100 and method 300 including the presently disclosed self-aligning optical fiber system 110 may provide a simple and cost-effective way of automating a multiple fibers alignment operation in microfluidics cartridge 170 and microfluidics instrument 160 to establish various channels for optic transmission. This innovation places only a single low-cost injection molded polymer part on the disposable cartridge side and keeps all mechanics on the instrument-side.

Referring now again to FIG. 1 through FIG. 26, microfluidics system 100 and method 300 including the presently disclosed self-aligning optical fiber system 110 may provide a mechanism wherein each individual cartridge ferrule assembly 136 of microfluidics cartridge 170 may be processed independently prior to cartridge integration, without affecting the mechanism alignment. This is possible because each optical fiber channel may be individually aligned and, accordingly, part-part variation may not affect it. Independent processing is advantageous because it enables novel chemistries to be applied to each individual sensor 176 of its corresponding cartridge ferrule assembly 136.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

The terms "comprise," "comprises," "comprising," "include," "includes," and "including," are intended to be non-limiting, such that recitation of items in a list is not to the exclusion of other like items that may be substituted or added to the listed items.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present disclosure.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

Various modifications and variations of the disclosed methods, compositions and uses of the invention will be apparent to the skilled person without departing from the scope and spirit of the invention. Although the invention has been disclosed in connection with specific preferred aspects or embodiments, it should be understood that the invention as claimed should not be unduly limited to such specific aspects or embodiments.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

Although the foregoing subject matter has been described in some detail by way of illustration and example for purposes of clarity of understanding, it will be understood by those skilled in the art that certain changes and modifications can be practiced within the scope of the appended claims.

We claim:

1. A microfluidics system comprising:
   (a) a microfluidics instrument, wherein the microfluidics instrument includes an optical detection system comprising a plurality of instrument optical fiber segments;
   (b) a microfluidics cartridge comprising a plurality of cartridge optical fiber segments; and
   (c) a self-aligning optical fiber system;
   wherein the self-aligning optical fiber system is configured to optically couple the plurality of instrument optical fiber segments of the microfluidics instrument and the plurality of cartridge optical fiber segments of the microfluidics cartridge.

2. The microfluidics system of claim 1, wherein the self-aligning optical fiber system comprises an instrument fiber optic coupler and a cartridge fiber optic connector.

3. The microfluidics system of claim 2, wherein the optical detection system comprises an illumination source and an optical measurement device.

4. The microfluidics system of claim 3, wherein self-aligning optical fiber system comprises a plurality of optical detection channels, and wherein each of the plurality of optical detection channels comprises an instrument optical channel and a cartridge optical channel.

5. The microfluidics system of claim 4, wherein each of the instrument optical channels optically connects each of the cartridge optical channels to the optical measurement device.

6. The microfluidics system of claim 5, wherein the self-aligning optical fiber system comprises from about 4 to about 16 optical detection channels.

7. The microfluidics system of claim 6, wherein the instrument fiber optic coupler comprises a plurality of instrument ferrule assemblies each comprising a leading tip end and an instrument optical fiber segment of the plurality of instrument optical fiber segments.

8. The microfluidics system of claim 7, wherein the cartridge fiber optic connector further comprises a plurality of cartridge ferrule assemblies each comprising a receiving end capable of receiving an instrument ferrule assembly of the plurality of instrument ferrule assemblies and each comprising a cartridge optical fiber segment of the plurality of cartridge optical fiber segments.

9. The microfluidics system of claim 8, wherein the microfluidics instrument further comprises a movable slide mechanism, and wherein the movable slide mechanism is operable to create an optical coupling between the microfluidics instrument and the microfluidics cartridge by engaging the instrument fiber optic coupler with the cartridge fiber optic connector.

10. The microfluidics system of claim 9, wherein the movable slide mechanism is operable to engage the plurality of instrument ferrule assemblies to the plurality of cartridge ferrule assemblies and thereby coupling the plurality of instrument optical fiber segments to the plurality of cartridge optical fiber segments.

11. The microfluidics system of claim 10, wherein the movable slide mechanism comprises a slidable base plate mounted on a rail, a backplate mounted on the end of slidable base plate, a leadscrew and associated motor operable to advance and/or retract the instrument fiber optic coupler with respect to the cartridge fiber optic connector.

12. The microfluidics system of claim 1, wherein the microfluidic cartridge further comprises:

(a) a bottom substrate, wherein the bottom substrate comprises a droplet operations surface;
(b) a top substrate; and
wherein the bottom substrate and the top substrate are separated by a droplet operation gap therebetween.

13. The microfluidics system of claim 12, wherein the bottom substrate or top substrate comprise a PCB substrate, a glass substrate or a silicon substrate, and wherein the PCB substrate, glass substrate, or silicon substrate is optionally coated with a dielectric layer and one or more electrodes operable for droplet operations.

14. The microfluidics system of claim 13, wherein the droplet operation gap between the bottom substrate and the top substrate is filled with a filler fluid.

15. The microfluidics system of claim 14, wherein the filler fluid is a low-viscosity oil or a halogenated oil.

16. The microfluidics system of claim 15, wherein the microfluidics cartridge is a digital microfluidics cartridge (DMF).

17. The microfluidics system of claim 16, wherein the optical detection system comprises one or more surface plasmon resonance (SPR) sensors or one or more localized surface plasmon resonance (LSPR) sensors.

18. The microfluidics system of claim 1, wherein the plurality of instrument optical fiber segments are aligned to within about 0.7 mm of the plurality of cartridge optical fiber segments.

19. The microfluidics system of claim 1, wherein the plurality of instrument optical fiber segments are aligned to within about 0.05 mm of the plurality of cartridge optical fiber segments.

* * * * *